US009555740B1

United States Patent
Zhu et al.

(10) Patent No.: US 9,555,740 B1
(45) Date of Patent: Jan. 31, 2017

(54) CROSS-VALIDATING SENSORS OF AN AUTONOMOUS VEHICLE

(71) Applicant: Google Inc., Mountain View, CA (US)

(72) Inventors: Jiajun Zhu, Palo Alto, CA (US); Dmitri A. Dolgov, Los Altos, CA (US); Christopher Paul Urmson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/946,967

(22) Filed: Nov. 20, 2015

Related U.S. Application Data

(63) Continuation of application No. 13/628,986, filed on Sep. 27, 2012, now Pat. No. 9,221,396.

(51) Int. Cl.
*H04N 7/18* (2006.01)
*B60R 1/00* (2006.01)
*B60Q 9/00* (2006.01)
*G08G 1/16* (2006.01)
*G01D 18/00* (2006.01)

(52) U.S. Cl.
CPC .............. *B60Q 9/008* (2013.01); *G01D 18/00* (2013.01); *G08G 1/163* (2013.01); *G08G 1/166* (2013.01)

(58) Field of Classification Search
USPC ........................................................ 348/148
See application file for complete search history.

(56) References Cited

U.S. PATENT DOCUMENTS

| | | |
|---|---|---|
| 5,214,408 A | 5/1993 | Asayama |
| 8,521,352 B1 | 8/2013 | Ferguson et al. |
| 9,221,396 B1 * | 12/2015 | Zhu ........................ G01S 17/023 |
| 2006/0208169 A1 | 9/2006 | Breed et al. |
| 2008/0012938 A1 | 1/2008 | Kubota et al. |
| 2009/0115610 A1 | 5/2009 | Steinhage et al. |
| 2009/0177347 A1* | 7/2009 | Breuer ...................... B60T 7/22 |
| | | 701/31.4 |
| 2010/0169013 A1 | 7/2010 | Nakamura et al. |
| 2010/0312461 A1 | 12/2010 | Haynie et al. |
| 2011/0035123 A1 | 2/2011 | Katrak et al. |
| 2011/0075518 A1 | 3/2011 | Huhta et al. |

(Continued)

FOREIGN PATENT DOCUMENTS

JP             6-195121        7/1994

*Primary Examiner* — Christopher S Kelley
*Assistant Examiner* — Asmamaw G Tarko
(74) *Attorney, Agent, or Firm* — Lerner, David, Littenberg, Krumholz & Mentlik, LLP

(57) ABSTRACT

Methods and systems are disclosed for cross-validating a second sensor with a first sensor. Cross-validating the second sensor may include obtaining sensor readings from the first sensor and comparing the sensor readings from the first sensor with sensor readings obtained from the second sensor. In particular, the comparison of the sensor readings may include comparing state information about a vehicle detected by the first sensor and the second sensor. In addition, comparing the sensor readings may include obtaining a first image from the first sensor, obtaining a second image from the second sensor, and then comparing various characteristics of the images. One characteristic that may be compared are object labels applied to the vehicle detected by the first and second sensor. The first and second sensors may be different types of sensors.

20 Claims, 14 Drawing Sheets

(56) References Cited

U.S. PATENT DOCUMENTS

| | | |
|---|---|---|
| 2011/0115615 A1* | 5/2011 | Luo .......................... B60R 1/00 340/436 |
| 2011/0166746 A1* | 7/2011 | Breuer ...................... B60T 7/22 701/29.2 |
| 2012/0136510 A1* | 5/2012 | Min ........................ G01S 17/88 701/2 |
| 2012/0269387 A1 | 10/2012 | Becker et al. |
| 2013/0058527 A1 | 3/2013 | Peynot |
| 2013/0245877 A1* | 9/2013 | Ferguson .................. B60R 1/00 701/23 |
| 2013/0300872 A1 | 11/2013 | Park |
| 2013/0321629 A1* | 12/2013 | Zhang .................. H04N 17/002 348/148 |

* cited by examiner

CROSS-VALIDATING SENSORS OF AN AUTONOMOUS VEHICLE

CROSS-REFERENCE TO RELATED APPLICATIONS

The present application is a continuation of U.S. patent application Ser. No. 13/628,986, filed Sep. 27, 2012, the disclosure of which is incorporated herein by reference.

BACKGROUND

An autonomous vehicle may use various computing systems to aid in the transport of passengers from one location to another. In addition, the autonomous vehicle may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the autonomous vehicle) to an autonomous mode (where the autonomous vehicle essentially drives itself) to modes that lie somewhere in between.

The autonomous vehicle may be equipped with various types of sensors in order to detect objects in its environment. For example, the autonomous vehicles may include such sensors as lasers, sonar, radar, cameras, and other sensors that scan and record data from the autonomous vehicle's environment. Sensor data from one or more of these sensors may be used to detect objects and their respective characteristics (position, shape, heading, speed, etc.). This detection and identification is a critical function for the safe operation of the autonomous vehicle.

To navigate an environment confidently and precisely, the autonomous vehicle may rely on a prior stored electronic representation of the environment (e.g., a roadway, a highway, etc.). The electronic representation of the environment may be considered a "map" that identifies such features as lane markings, lane edges, k-rail concrete barriers, lane dividers, road medians, traffic safety cones, and other such features. The autonomous vehicle may store the map for both complex and simple environments.

However, the sensors on the autonomous vehicle may experience one or more problems, such as failure, inaccurate readings, or other such problems. When the sensor has a problem, the sensor may be unusable for determining whether there are objects, such as other vehicles, proximate to the autonomous vehicle. Having a sensor failure decreases the ability of the autonomous vehicle to navigate its environment confidently and precisely.

BRIEF SUMMARY

An apparatus and method are disclosed. In one embodiment, the apparatus includes a first sensor configured to detect a vehicle in a driving environment, a second sensor configured to detect the vehicle in the driving environment, and a memory that stores detailed map information for the driving environment, first sensor parameters for determining whether the vehicle is present in a first image of the driving environment, and second sensor parameters for determining whether the vehicle is present in a second image of the driving environment. The apparatus may also include a processor in communication with the memory, the first sensor and the second sensor, the processor being configured to receive first sensor information from the first sensor, the first sensor information being used to produce the first image and receive second sensor information from the second sensor, the second sensor information being used to produce the second image. The processor may also be configured to determine whether the vehicle is in both the first image and the second image, determine a deviation value by comparing the first image with the second image when it is determined that the vehicle is present in the first image and the second image, and compare the determined deviation value with a deviation threshold to determine whether the first or second sensor has a problem detecting the vehicle.

In another embodiment of the apparatus, the first sensor is a first type of imaging sensor and the second sensor is a second type of imaging sensor, the first type of imaging sensor being different than the second type of imaging sensor.

In a further embodiment of the apparatus, the processor is further configured to select the first sensor as a reference sensor for determining whether the second sensor has the problem detecting the vehicle.

In yet another embodiment of the apparatus, the processor selects the first sensor based on a predetermined time interval.

In yet a further embodiment of the apparatus, the processor selects the second sensor for cross-validation with the first sensor based on an amount of time that has elapsed since the second sensor was last cross-validated.

In another embodiment of the apparatus, the memory further stores a multi-level failure threshold comprising a plurality of levels, wherein each level is associated with an action for the processor to perform, and a level of the plurality of levels is associated with a condition of the deviation value exceeding the deviation threshold. The processor may also perform the action of the level associated with the condition of the deviation value exceeding the deviation threshold when the processor determines that the deviation value exceeds the deviation threshold.

In a further embodiment of the apparatus, the memory stores a failure count threshold that identifies an action to be performed when the failure count threshold is exceeded, the comparison of the determined deviation value with the deviation threshold causes the failure count threshold to be exceeded, and the action identified by the failure count threshold is performed.

In yet another embodiment of the apparatus, the first image comprises a plurality of images determined from the first sensor information, the first sensor information being received during a predetermined time interval, and the second image comprises a plurality of images determined from the second sensor information, the second sensor information being received during the predetermined time interval. The processor may also be configured to determine first state information about the vehicle from the first plurality of images, determine second state information about the vehicle from the second plurality of images, and compare the first state information with the second state information to determine the deviation value.

In yet a further embodiment of the apparatus, the first state information comprises at least one of a first vehicle speed, a first vehicle position, or a first vehicle heading, the second state information comprises at least one of a second vehicle speed, a second vehicle position, or a second vehicle heading, and the processor compares at least one of the first vehicle speed, first vehicle position or first vehicle heading with at least one of the second vehicle speed, second vehicle position, or second vehicle heading.

In another embodiment of the apparatus, the first image comprises a first object label encompassing the vehicle, the first object label comprising a first parameter that defines a characteristic of the first object label, the second image comprises a second object label encompassing the vehicle, the second object label comprising a second parameter that defines a characteristic of the second object label, and the processor compares the first image with the second image to determine the deviation value by comparing the first object label with the second object label.

In yet another embodiment of the apparatus, the processor compares the first object label with the second object label by comparing the first parameter with the second parameter.

In one embodiment of the method, the method includes receiving, with a processor in communication with a first sensor, first sensor information, the first sensor information being used to produce a first image of a driving environment, receiving, with the processor in communication with the second sensor, second sensor information, the second sensor information being used to produce the second image of the driving environment, and determining, with the processor, whether a vehicle is present in both the first image and the second image. The method may also include determining, with the processor, a deviation value by comparing the first image with the second image when it is determined that the vehicle is present in the first image and the second image, and comparing, with the processor, the determined deviation value with a deviation threshold to determine whether the first or second sensor has a problem detecting the vehicle.

In another embodiment of the method, the first sensor is a first type of imaging sensor and the second sensor is a second type of imaging sensor, the first type of imaging sensor being different than the second type of imaging sensor.

In a further embodiment of the method, the method includes selecting, with the processor, the first sensor as a reference sensor for determining whether the second sensor has the problem detecting the vehicle.

In yet another embodiment of the method, the method includes selecting, with the processor, the first sensor based on a predetermined time interval.

In yet a further embodiment of the method, the method includes selecting, with the processor, the second sensor for cross-validation with the first sensor based on an amount of time that has elapsed since the second sensor was last cross-validated.

In another embodiment of the method, the method includes determining whether the deviation value exceeds a deviation threshold associated with a level of a multi-level failure threshold, wherein an action for the processor to perform is associated with the level, and performing the action of the level based on the determination that the deviation value exceeds the deviation threshold.

In a further embodiment of the method, the comparison of the determined deviation value with the deviation threshold causes a failure count threshold to be exceeded, the failure count threshold identifying an action to be performed when the failure count threshold is exceeded. The method may also include performing the action identified by the failure count threshold.

In yet another embodiment of the method, the first image comprises a plurality of images determined from the first sensor information, the first sensor information being received during a predetermined time interval, and the second image comprises a plurality of images determined from the second sensor information, the second sensor information being received during the predetermined time interval. The method may also include determining, with the processor, the first state information about the vehicle from the first plurality of images, determining, with the processor, second state information about the vehicle from the second plurality of images, and comparing, with the processor, the first state information with the second state information to determine the deviation value.

In yet a further embodiment of the method, the first state information comprises at least one of a first vehicle speed, a first vehicle position, or a first vehicle heading, and the second state information comprises at least one of a second vehicle speed, a second vehicle position, or a second vehicle heading. The method may also include comparing, with the processor, at least one of the first vehicle speed, first vehicle position or first vehicle heading with at least one of the second vehicle speed, second vehicle position, or second vehicle heading.

In another embodiment of the method, the first image comprises a first object label encompassing the vehicle, the first object label comprising a first parameter that defines a characteristic of the first object label, and the second image comprises a second object label encompassing the vehicle, the second object label comprising a second parameter that defines a characteristic of the second object label. The method may also include comparing, with the processor, the first image with the second image to determine the deviation value by comparing the first object label with the second object label.

In a further embodiment of the method, comparing the first object label with the second object label comprises comparing the first parameter with the second parameter.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This disclosure provides for systems and methods for cross-validating one or more sensors of an autonomous vehicle. In particular, this disclosure provides for an autonomous vehicle that evaluates whether a sensor is accurately detecting an object (i.e., the sensor being cross-validated) based on the detection of that object by another sensor (i.e., a reference sensor). Using the reference sensor to evaluate whether a second sensor is operating as expected is referred to as "cross-validation." In this regard, the reference sensor may be a different type of sensor than the second sensor (i.e., the sensor being evaluated).

In evaluating the second sensor, the autonomous vehicle may, in a first embodiment, determine one or more object parameter values from the reference sensor having detected an object, determine one or more expected object parameter values for the second sensor based on the determined object parameter values from the reference sensor, and then compare the expected object parameter values with the object parameter values (if any) determined from the second sensor having detected the object.

In a second embodiment, the autonomous vehicle may compare a first object label applied to the detected object by the autonomous vehicle based on sensor data received from the reference sensor, and then compare the first object label with a second object label applied to the detected object by the autonomous vehicle based sensor data received from the second sensor. In this regard, either embodiment, or a combination thereof, may facilitate the cross-validation of one or more sensors of the autonomous vehicle.

Figure 1:
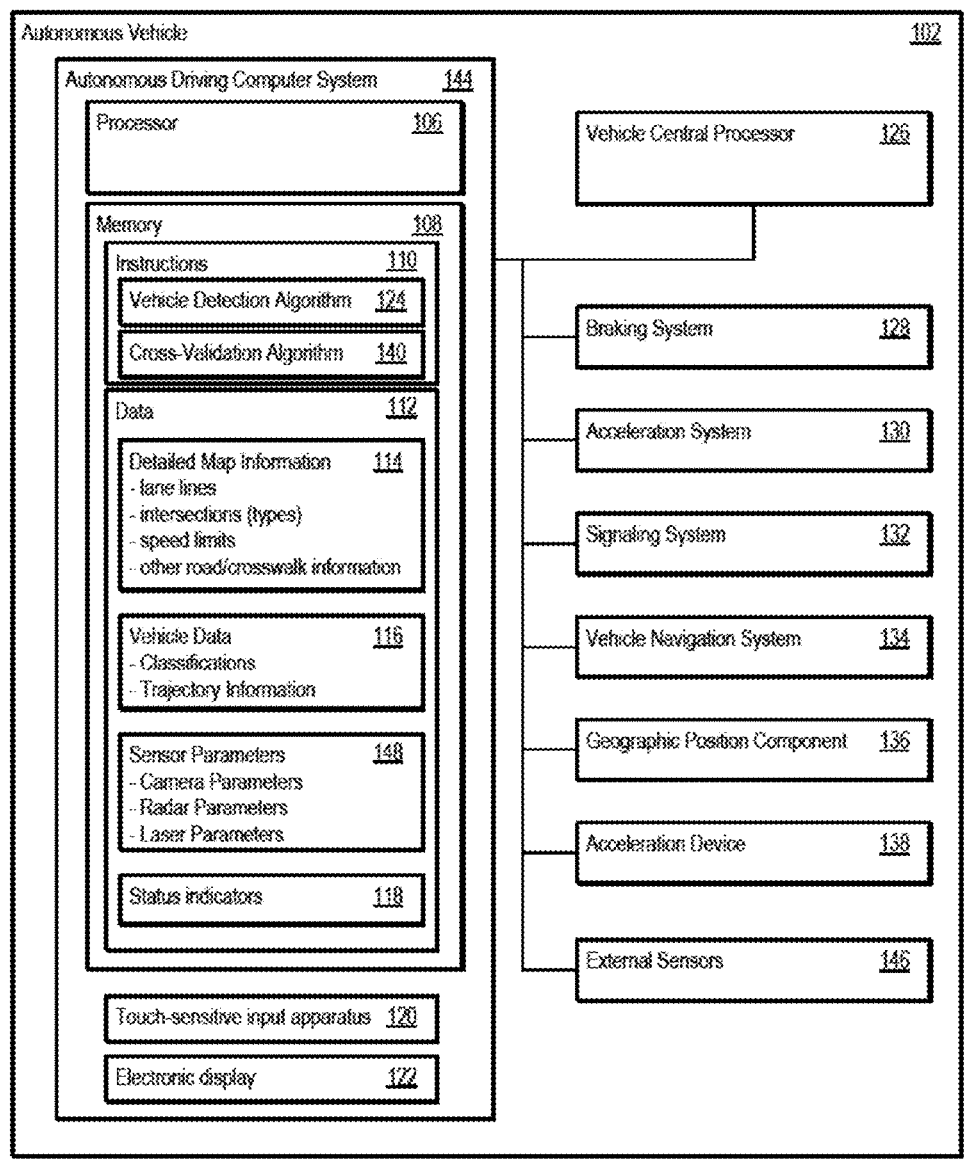
FIG. 1 illustrates an example of an autonomous vehicle configured to cross-validate one or more sensors of the autonomous vehicle according to aspects of the disclosure.

FIG. 1 illustrates an autonomous vehicle 102 configured to cross-validate one or more of its sensors. The autonomous vehicle 102 may be configured to operate autonomously, e.g., drive without the assistance of a human driver. Moreover, the autonomous vehicle 102 may be configured to detect various objects and determine whether the detected object is a vehicle.

While certain aspects of the disclosure are particularly useful in connection with specific types of vehicles, the autonomous vehicle 102 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys.

In one embodiment, the autonomous driving computer system 144 may include a processor 106 and a memory 108. The autonomous driving computer system 144 may also include other components typically present in a general purpose computer.

The memory 108 may store information accessible by the processor 106, such as instructions 110 and data 112 that may be executed or otherwise used by the processor 106. The memory 108 may be of any type of memory operative to store information accessible by the processor 106, including a computer-readable medium, or other medium that stores data that may be read with the aid of an electronic device. Examples of the memory 108 include, but are not limited, a hard-drive, a memory card, read-only memory ("ROM"), random-access memory ("RAM"), digital video disc ("DVD"), or other optical disks, as well as other write-capable and read-only memories. Systems and methods may include different combinations of the foregoing, whereby different portions of the instructions and data are stored on different types of media.

The instructions 110 may be any set of instructions that may be executed directly (such as machine code) or indirectly (such as scripts) by the processor 106. For example, the instructions 110 may be stored as computer code on the computer-readable medium. In that regard, the terms "instructions" and "programs" may be used interchangeably herein. The instructions 110 may be stored in object code format for direct processing by the processor 106, or in any other computer language including scripts or collections of independent source code modules that are interpreted on demand or compiled in advance. Functions, methods and routines of the instructions 110 are explained in more detail below.

The data 112 may be retrieved, stored, or modified by processor 106 in accordance with the instructions 110. For instance, although the disclosed embodiments not limited by any particular data structure, the data 112 may be stored in computer registers, in a relational database as a table having a plurality of different fields and records, XML documents, flat files, or in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 112 may comprise any information sufficient to identify the relevant information, such as numbers, descriptive text, proprietary codes, references to data stored in other areas of the same memory or different memories (including other network locations) or information that is used by a function to calculate the relevant data.

The processor 106 may be any conventional processor, including Reduced Instruction Set Computing ("RISC") processors, Complex Instruction Set Computing ("CISC") processors, or combinations of the foregoing. Alternatively, the processor may be a dedicated device such as an applicant-specific integrated circuit ("ASIC").

Although FIG. 1 functionally illustrates the processor 106, the memory 108, and other elements of the autonomous driving computer system 144 as being within the same block, it will be understood by those of ordinary skill in the art that the processor 106 and the memory 108 may actually comprise multiple processors and memories that may or may not be stored within the same physical housing. For example, the memory 108 may be a hard drive or other storage media located in a housing different from that of the autonomous driving computer system 144.

Accordingly, references to a processor or computer will be understood to include references to a collection of processors or computers or memories that may or may not operate in parallel. Rather than using a single processor to perform the acts described herein, some of the components, such as steering components and deceleration components, may each have their own processor that only performs calculations related to the component's specific function.

In various embodiments described herein, the processor 106 may be located remotely from the autonomous vehicle 102 and may communicate with the autonomous vehicle wirelessly. In other aspects, some of the processes described herein are executed on a processor disposed within the autonomous vehicle 102 and others by a remote processor, including taking the acts necessary to execute a single maneuver.

The autonomous driving computer system 144 may include all of the components normally used in connection with a computer, such as a central processing unit (CPU), a memory (e.g., RAM and internal hard drives) storing data 112 and instructions such as an Internet browser or other software application, an electronic display 122 (e.g., a monitor having a screen, a small liquid crystal display ("LCD") touch-screen or any other electrical device that is operable to display information), one or more user input devices (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

The autonomous vehicle 102 may also include a geographic position component 136 in communication with the autonomous driving computer system 144 for determining the geographic location of the autonomous vehicle 102. For example, the geographic position component 136 may include a Global Positioning System ("GPS") receiver to determine the autonomous vehicle's 102 latitude, longitude and/or altitude position. Other location systems such as laser-based localization systems, inertial-aided GPS, or camera-based localization may also be used to identify the location of the vehicle. The location of the autonomous vehicle 102 may include an absolute geographical location, such as latitude, longitude, and altitude as well as relative location information, such as location relative to other vehicles immediately around it, which can often be determined with less noise than absolute geographical location.

The geographic position component 136 may also include other devices in communication with the autonomous driving computer system 144, such as an accelerometer, gyroscope or another direction/speed detection device 138 to determine the direction and speed of the vehicle or changes thereto. By way of example only, the geographic position component 136 may determine its pitch, yaw or roll (or changes thereto) relative to the direction of gravity or a plane perpendicular thereto. The geographic position component 136 may also track increases or decreases in speed and the direction of such changes. The location and orientation data as set forth herein may be provided automatically to the user, the autonomous driving computer 144, the vehicle central processor 126, other computers and combinations of the foregoing.

The autonomous driving computer system 144 may control the direction and speed of the autonomous vehicle 102 by controlling various components. By way of example, if the autonomous vehicle 102 is operating in a completely autonomous mode, the autonomous driving computer system 144 may cause the autonomous vehicle 102 to accelerate via the acceleration system 130 (e.g., by increasing fuel or other energy provided to the engine), decelerate via the braking system 128 (e.g., by decreasing the fuel supplied to the engine or by applying brakes) and change direction (e.g., by turning the front two wheels). The autonomous driving computer system 144 may also control one or more systems, such as the signaling system 130, when controlling the acceleration system 130 and/or the braking system 128.

The autonomous driving computer system 144 may also control one or more status indicators 118, which may convey the status of the autonomous vehicle 102 and its components to a passenger. For example, the autonomous vehicle 102 may be equipped with an electronic display 122 for displaying information relating to the overall status of the vehicle, particular sensors, or information about or from the autonomous driving computer system 144. The electronic display 122 may display computer-generated images of the vehicle's surroundings including, for example, the status of the autonomous driving computer system 144, the autonomous vehicle 102 itself, roadways, intersections, as well as other objects and information.

The autonomous driving computer system 144 may use visual or audible cues to indicate whether it is obtaining valid data from one or more sensors, whether a passenger or the autonomous driving computer system 144 is partially or completely controlling the direction or speed of the autonomous vehicle 102 or both, such as whether there are any errors, etc. In addition, the autonomous driving computer system 144 may also have external indicators which indicate whether, at the moment, a human or an automated system is in control of the vehicle, that are readable by humans, other computers, or both.

The autonomous driving computer system 144 may also communicate with other components of the autonomous vehicle 102. For example, the autonomous driving computer system 144 may communicate with a vehicle central processor 126. The autonomous driving computer system 144 may also send and receive information from the various systems of the autonomous vehicle 102. Communicating with the various systems may include communicating with the braking system 128, the acceleration system 130, the signaling system 132, and the vehicle navigation system 134. Communications with these systems may facilitate the control of the movement, speed, etc. of the autonomous vehicle 102. In addition, when engaged, autonomous driving computer system 144 may control some or all of these functions of the autonomous vehicle 102 and thus be fully or partially autonomous. Although various systems and the autonomous driving computer system 144 are shown within the autonomous vehicle 102, these systems and components may be external to the autonomous vehicle 102 or physically separated by large distances.

The autonomous vehicle 102 may also include one or more sensors 146 for detecting objects external to it, such as other vehicles, obstacles in the roadway, traffic signals, signs, trees, etc. The sensors 146 may include lasers, sonar, radar, cameras or any other detection devices. For example, where the autonomous vehicle 102 is a small passenger car, the small passenger car may include a laser mounted on the roof or other convenient location. In one aspect, the laser may measure the distance between the autonomous vehicle 102 and the object surfaces facing the autonomous vehicle 102 by spinning on its axis and changing its pitch. The autonomous vehicle 102 may also include various radar detection units, such as those used for adaptive cruise control systems. The radar detection units may be located on the front and back of the car as well as on either side of the front bumper. In another example, a variety of cameras may be mounted on the autonomous vehicle 102 at known distances from one another. In this manner, the parallax from the different images may be used to compute the distance to various objects captured by the one or more cameras. These sensors may assist the vehicle in responding to its environment to maximize safety for passengers as well as objects or people in the environment.

Figure 3:
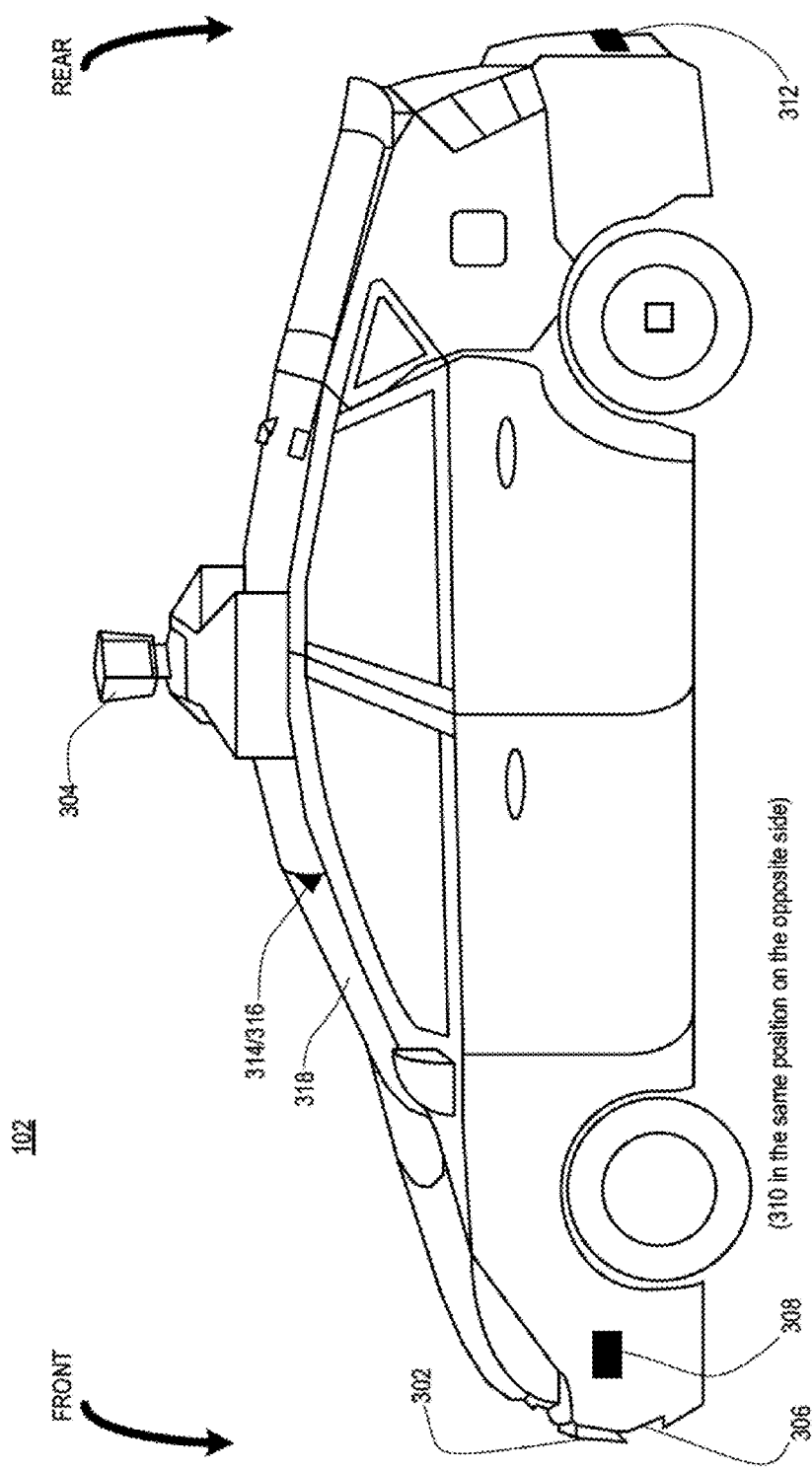
FIG. 3 illustrates an example of the placement of the one or more sensors of the autonomous vehicle according to aspects of the disclosure.

FIG. 3 illustrates one example of the autonomous vehicle 102 and the placement of its one or more sensors. The autonomous vehicle 102 may include lasers 302 and 304, for example, mounted on the front and top of the autonomous vehicle 102, respectively. The laser 302 may have a range of approximately 150 meters, a thirty degree vertical field of view, and approximately a thirty degree horizontal field of view. The laser 304 may have a range of approximately 50-80 meters, a thirty degree vertical field of view, and a 360 degree horizontal field of view. The lasers 302-304 may provide the autonomous vehicle 102 with range and intensity information that the processor 106 may use to identify the location and distance of various objects. In one aspect, the lasers 302-304 may measure the distance between the vehicle and object surfaces facing the vehicle by spinning on its axes and changing their pitch. Other lasers with different ranges and fields of view may also be used.

The autonomous vehicle 102 may also include various radar detection units, such as those used for adaptive cruise control systems. The radar detection units may be located on the front and back of the car as well as on either side of the front bumper. As shown in the example of FIG. 3, the autonomous vehicle 102 includes radar detection units 306-312 located on the side (only one side being shown), front and rear of the vehicle. Each of these radar detection units 306-312 may have a range of approximately 200 meters for an approximately 18 degree field of view as well as a range of approximately 60 meters for an approximately 56 degree field of view. Again, other radar detection units with different ranges and fields of view may also be used.

In another example, a variety of cameras may be mounted on the autonomous vehicle 102. The cameras may be mounted at predetermined distances so that the parallax from the images of two or more cameras may be used to compute the distance to various objects. As shown in FIG. 3, the autonomous vehicle 102 may include two cameras 314-316 mounted under a windshield 318 near the rear view mirror (not shown). The camera 314 may include a range of approximately 200 meters and an approximately 30 degree horizontal field of view, while the camera 316 may include a range of approximately 100 meters and an approximately 60 degree horizontal field of view. Other cameras with different ranges and fields of view may also be used.

Figure 4A:
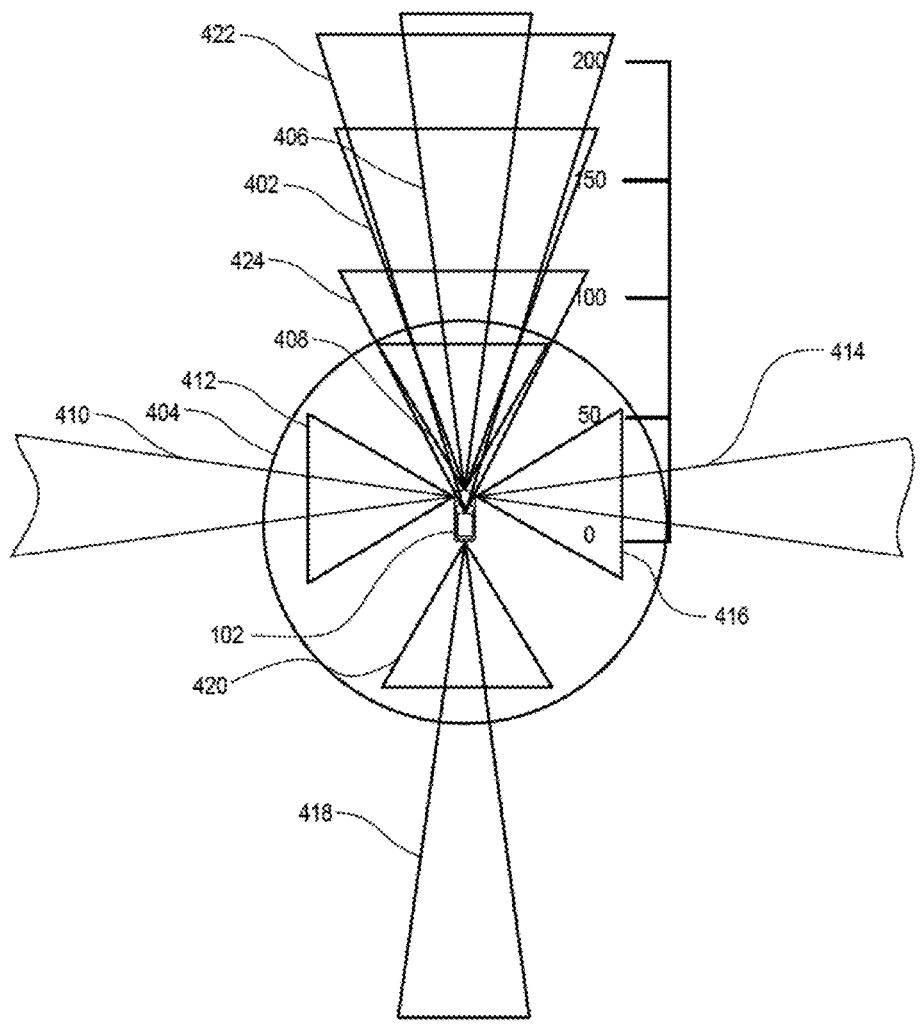
FIGS. 4A-4D illustrate various views of the approximate sensor fields of the various sensors of the autonomous vehicle according to aspects of the disclosure.

Each sensor may be associated with a particular sensor field defined by the ranges and fields of view for which the sensor may be used to detect objects. FIG. 4A is a top-down view of the approximate sensor fields of the various sensors. FIG. 4B depicts the approximate sensor fields 402 and 404 for the lasers 302 and 304, respectively based on the fields of view for these sensors. In this example, the sensor field 402 includes an approximately 30 degree horizontal field of view for approximately 150 meters, and the sensor field 404 includes a 360-degree horizontal field of view for approximately 80 meters.

Figure 4D:
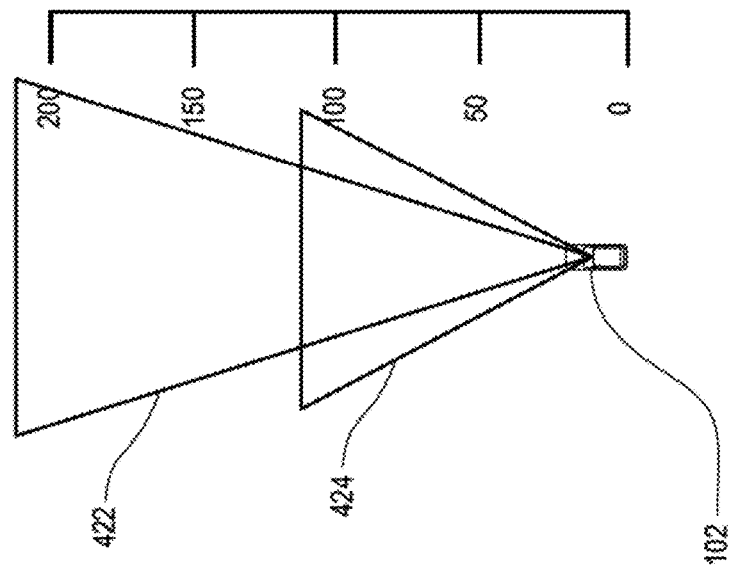
Figure 4B:
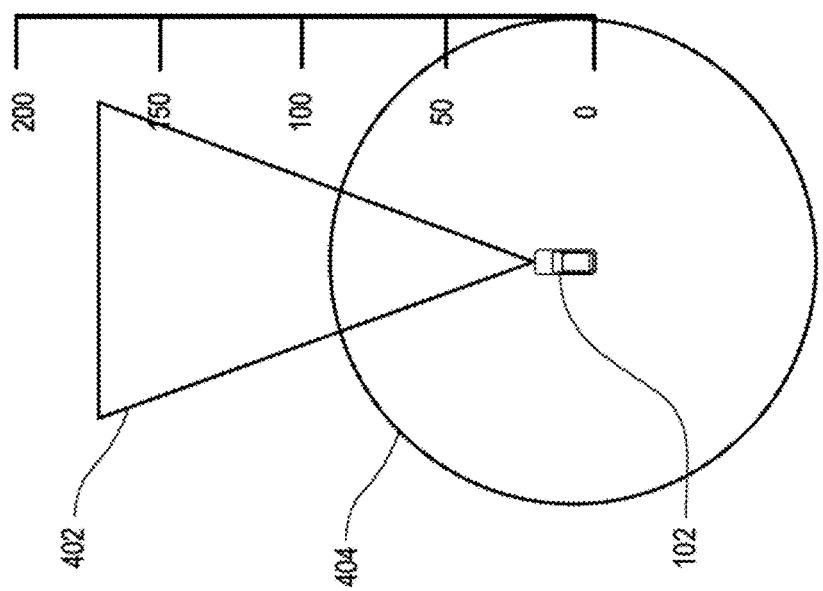
Figure 4C:
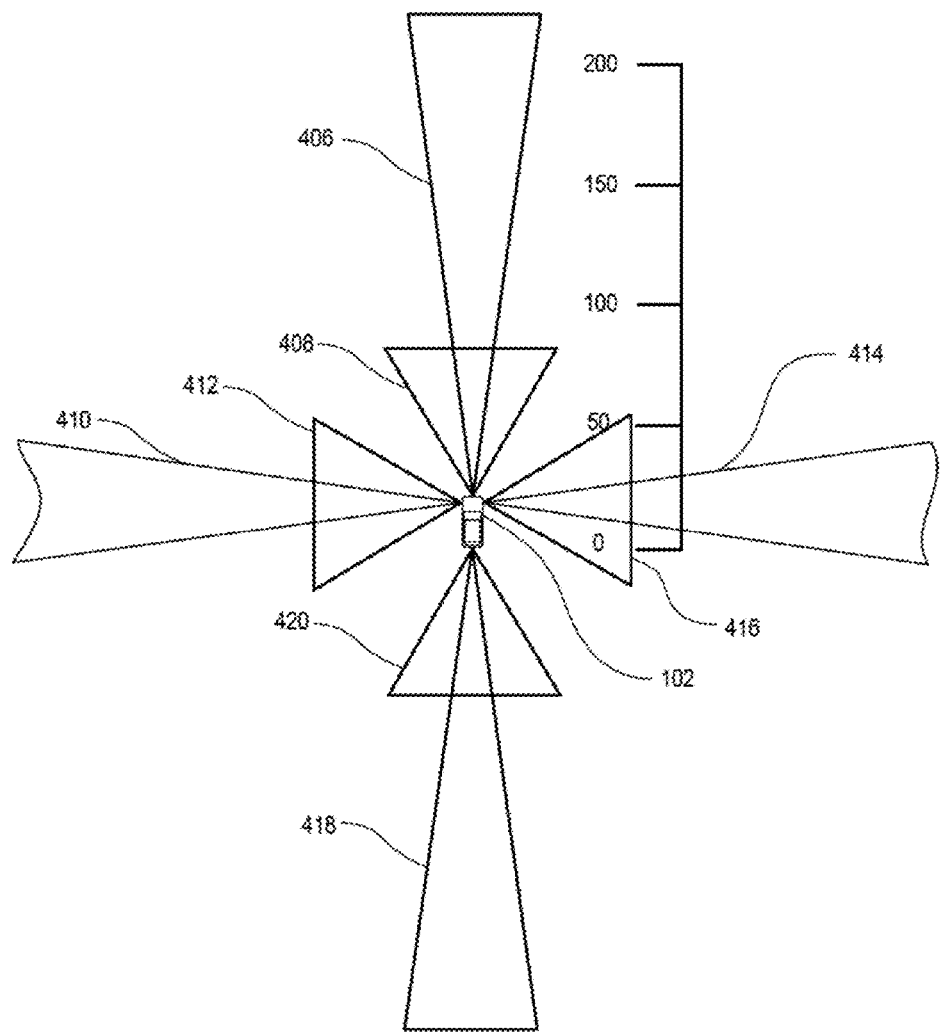

FIG. 4C depicts the approximate sensor fields 406-420 and for radar detection units 306-312, respectively, based on the fields of view for these sensors. For example, the radar detection unit 306 includes sensor fields 406 and 408. The sensor field 406 includes an approximately 18 degree horizontal field of view for approximately 200 meters, and the sensor field 408 includes an approximately 56 degree horizontal field of view for approximately 80 meters.

Similarly, the radar detection units 308-312 include the sensor fields 410/414/418 and sensor fields 412/416/420. The sensor fields 410/414/418 include an approximately 18 degree horizontal field of view for approximately 200 meters, and the sensor fields 412/416/420 include an approximately 56 degree horizontal field of view for approximately 80 meters. The sensor fields 410 and 414 extend passed the edge of FIGS. 4A and 4C.

FIG. 4D depicts the approximate sensor fields 422-424 of cameras 314-316, respectively, based on the fields of view for these sensors. For example, the sensor field 422 of the camera 314 includes a field of view of approximately 30 degrees for approximately 200 meters, and sensor field 424 of the camera 316 includes a field of view of approximately 60 degrees for approximately 100 meters.

In general, an autonomous vehicle 102 may include sonar devices, stereo cameras, a localization camera, a laser, and a radar detection unit each with different fields of view. The sonar may have a horizontal field of view of approximately 60 degrees for a maximum distance of approximately 6 meters. The stereo cameras may have an overlapping region with a horizontal field of view of approximately 50 degrees, a vertical field of view of approximately 10 degrees, and a maximum distance of approximately 30 meters. The localization camera may have a horizontal field of view of approximately 75 degrees, a vertical field of view of approximately 90 degrees and a maximum distance of approximately 10 meters. The laser may have a horizontal field of view of approximately 360 degrees, a vertical field of view of approximately 30 degrees, and a maximum distance of 100 meters. The radar may have a horizontal field of view of 60 degrees for the near beam, 30 degrees for the far beam, and a maximum distance of 200 meters. Hence, the autonomous vehicle 102 may be configured with any arrangement of sensors having different fields of view, ranges, and sensor fields, and each of these sensors may capture one or more raw images for detecting the various objects near and around the autonomous vehicle 102.

In addition to the sensors 146 described above, the autonomous driving computer system 144 may also use input from sensors found in non-autonomous vehicles. As examples, these sensors may include tire pressure sensors, engine temperature sensors, brake heat sensors, break pad status, tire tread sensors, fuel sensors, oil level and quality sensors, air quality sensors (for detecting temperature, humidity, or particulates in the air), etc.

The data provided by the sensors 146 may be processed by the autonomous driving computer system 144 in real-time. In this context, the sensors 146 may continuously update their output to reflect the environment being sensed at or over a range of time, and continuously or as demanded. The sensors 146 may provide the updated output to the autonomous driving computer system 144 so that it can determine whether the autonomous vehicle's 102 then-current direction or speed should be modified in response to the sensed environment.

Referring back to FIG. 1, the autonomous vehicle 102 may also include an electronic representation of a driving environment for maneuvering in the driving environment, and for determining whether there are one or more objects proximate to the autonomous vehicle 102 in the driving environment. For example, autonomous driving computer system 144 may include detailed map information 114 that defines one or more driving environments. The detailed map information 114 may include various maps that identify the shape and elevation of roadways, lane lines, intersections, crosswalks, speed limits, traffic signals, buildings, signs, real time traffic information, or other such objects and information. The detailed map information 114 may further include explicit speed limit information associated with various roadway segments. The speed limit data may be entered manually or scanned from previously taken images of a speed limit sign using, for example, optical-character recognition. In addition, the detailed map information 114 may include three-dimensional terrain maps incorporating one or more of the objects (e.g., crosswalks, intersections, lane lines, etc.) listed above.

The detailed map information 114 may also include lane marker information identifying the location, elevation, and shape of lane markers. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The autonomous vehicle 102 may also include persistent data for detecting objects and cross-validating one or more of the sensors 146 based on the detected objects. For example, the data 112 may include one or more sensor parameters 148 used by the processor 106 to determine when a sensor has detected an object, and the type of object detected by the sensor. More particularly, the sensor parameters 148 may define an arrangement of pixels, laser points, intensity maps, etc., should be considered an object. The sensor parameters 148 may also define how an object is classified.

Each of the sensors 146 of the autonomous vehicle 102 may be associated with a corresponding set of sensor parameters 148. Thus, the one or more camera(s) may be associated with camera parameters, the one or more laser(s) may be associated with laser parameters, and the one or more radar detection unit(s) may be associated with radar parameters. Examples of camera parameters may include the minimal brightness of a pedestrian, the minimum pixel size of a car object, the minimum width of a car object, and other such parameters. Examples of laser parameters may include the height of a pedestrian, the length of a car object, an obstacle detection threshold, and other such parameters. Examples of radar parameters may include minimum distance to an object, a delay threshold for detecting an object, the height of a pedestrian, and other such parameters.

In detecting vehicles in various driving environments, the data 112 may include vehicle data 116 that defines one or more parameters for classifying a vehicle. Classifications of vehicle may include such classifications as "passenger car," "bicycle," "motorcycle," and other such classifications. The parameters defined by the vehicle data 116 may inform the autonomous driving computer system 144 as to the type of vehicle detected by a given sensor. For example, the vehicle data 116 may include parameters that define the type of vehicle when the vehicle is detected by one or more of the camera sensors, one or more of the laser sensors, and so forth.

Vehicles may be identified through a vehicle detection algorithm 124, which the processor 106 may use to classify vehicles based on various characteristics, such as the size of the vehicle (bicycles are larger than a breadbox and smaller than a car), the speed of the vehicle (bicycles do not tend to go faster than 40 miles per hour or slower than 0.1 miles per hour), and other such characteristics. In addition, the vehicle may be classified based on specific attributes of the vehicle, such as information contained on a license plate, bumper sticker, or logos that appear on the vehicle.

The vehicle data 116 may also include state, positional, and/or trajectory information collected by the autonomous driving computer system 144 when a vehicle is detected. The autonomous driving computer system 144 may collect the state and/or positional information about a detected object such as a vehicle to assist in the determination of the detected vehicle's trajectory. The vehicle trajectory for the detected vehicle may define the direction and speed that a vehicle has when in a given driving environment. The vehicle trajectory may also define the past positions, directions, and speed that the detected vehicle had while in the driving environment.

The autonomous vehicle 102 may generate state information about detected objects, such as other vehicles, regardless of whether the autonomous vehicle 102 is operating in an autonomous mode or a non-autonomous mode. Thus, whether the autonomous vehicle 102 is operating by itself or has a driver, the autonomous vehicle 102 may collect state and object information, for example, in order to determine the aforementioned vehicle trajectories.

The instructions 110 may also include a cross-validation algorithm for cross-validating one or more of the sensors 146. As previously discussed, cross-validating a second sensor (i.e., the sensor being validated) may be performed by detecting an object with a first sensor, and then determining whether the second sensor also detects the object and/or the accuracy of the second sensor in detecting the object.

The autonomous driving computer system 144 may take various actions defined by the cross-validation algorithm 140 in response to the cross-validation operations previously described. For example, the autonomous driving computer system 144 may display a warning to a passenger of the autonomous vehicle 102 when the autonomous driving computer system 144 determines that the sensor being cross-validated is experiencing a problem (e.g., not accurately reporting a detected object) The warning may inform the passenger which sensor is not operating within operational parameters. As another example, the autonomous driving computer system 144 may request that a passenger take control of the autonomous vehicle 102. Moreover, the autonomous driving computer system 144 may perform a combination of actions, such as displaying the warning and requesting that a passenger take control of the autonomous vehicle 102.

Figure 2:
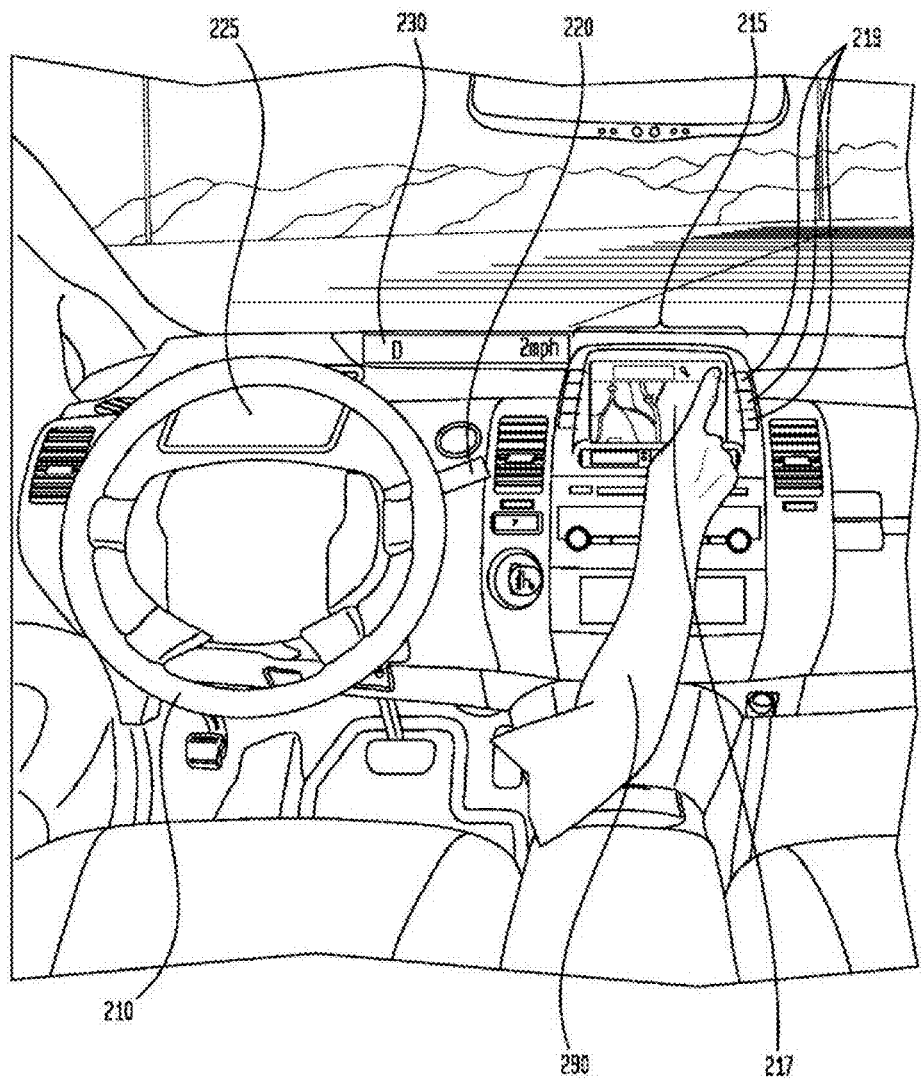
FIG. 2 illustrates an example of an interior of the autonomous vehicle according to aspects of the disclosure

FIG. 2 illustrates an example of an interior of the autonomous vehicle 102 according to aspects of the disclosure. The autonomous vehicle 102 may include all of the features of a non-autonomous vehicle, for example: a steering apparatus, such as steering wheel 210; a navigation display apparatus, such as navigation display 215; and a gear selector apparatus, such as gear shifter 220. The vehicle 102 may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 106.

The autonomous vehicle 102 may also include one or more additional displays. For example, the autonomous vehicle 102 may include a display 225 for displaying information regarding the status of the autonomous vehicle 102 or its computer. In another example, the autonomous vehicle 102 may include a status indicating apparatus such as status bar 230, to indicate the current status of vehicle 102. In the example of FIG. 2, the status bar 230 displays "D" and "2 mph" indicating that the autonomous vehicle 102 is presently in drive mode and is moving at 2 miles per hour. In that regard, the autonomous vehicle 102 may display text on an electronic display, illuminate portions of the autonomous vehicle 102, such as the steering wheel 210, or provide various other types of indications.

Figure 5:
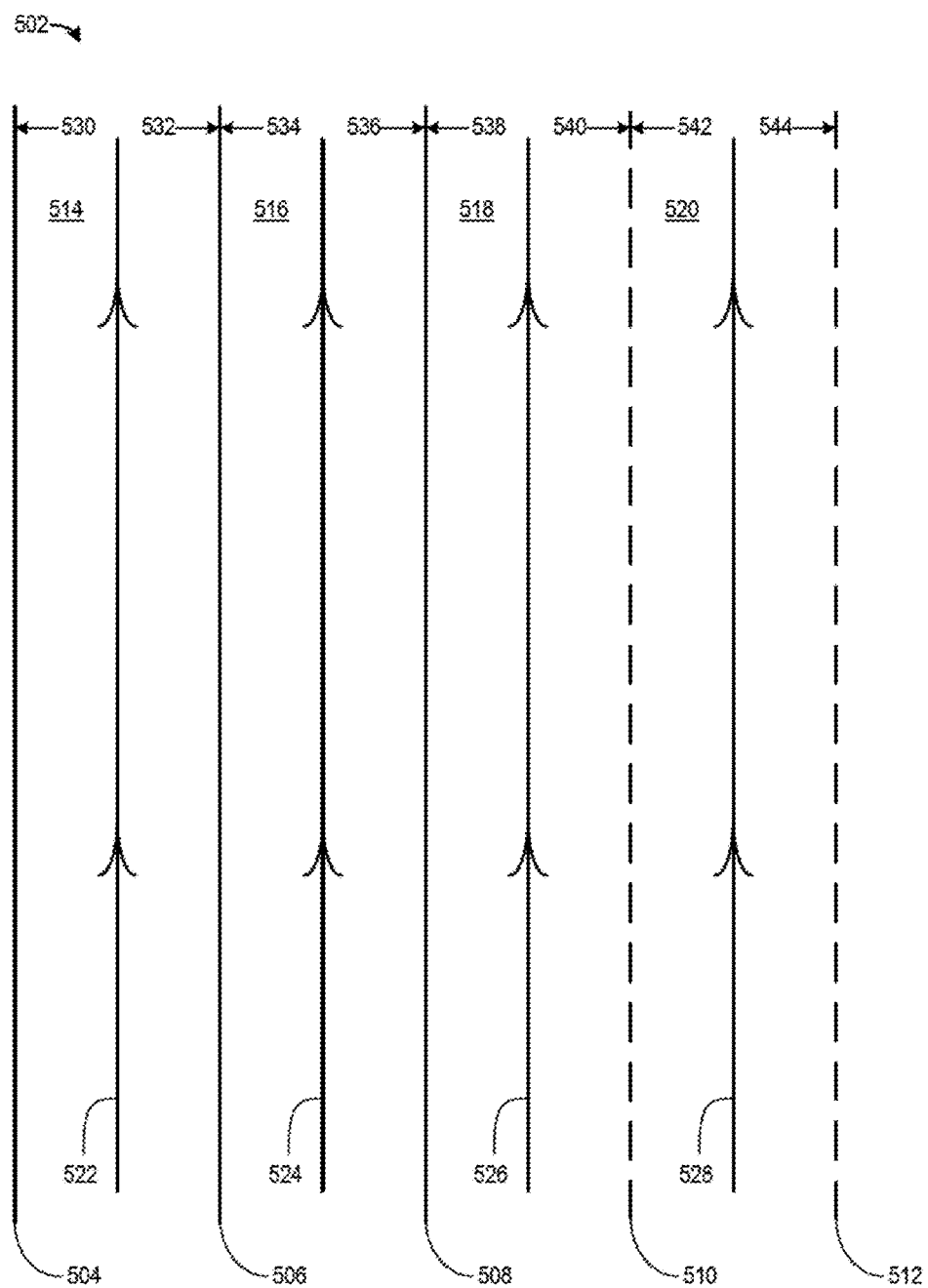
FIG. 5 illustrates an example of detailed map information that may be stored by the autonomous vehicle in accordance with aspects of the disclosure.

FIG. 5 illustrates an example of a portion of a detailed map 502 that may represent the driving environment of the autonomous vehicle 102. The detailed map 502 may be retrieved or referenced by the autonomous vehicle 102 based on a detected position of the autonomous vehicle 102. The detailed map 502 may be stored as part of the detailed map information 114.

The detailed map 502 may further represent a section of a road, such as highway, parkway, etc., and may include lane information such as information about solid lane lines 504-508 and broken lane lines 510-512. These lane lines may define lanes 514-520. Each of the lanes 514-520 may be associated with a respective centerline rail 522-528 which may indicate the direction in which a vehicle should generally travel in the respective lane. For example, a vehicle may follow centerline rail 522 when driving in lane 514. In this example, the lane 514 may be bounded by a left lane line 504 and the right lane line 506. Similarly, the lane 516 may be bounded by the left lane line 506 and the right lane line 508, the lane 518 may be bounded by the left lane line 508 and the right lane line 510, and the lane 520 may be bounded by the left lane line 510 and the right lane line 512.

Each of the lanes 514-520 may be bounded by corresponding lane edges. Thus, lane 514 may be bounded by edges 530,532, lane 516 may be bounded by edges 534,536, lane 518 may be bounded by edges 538,540 and lane 520 may be bounded by edges 542,544.

In the example shown in FIG. 5, the detailed map information 114 may be depicted as an image-based map. However, the detailed map information 114 need not be entirely or completely image-based (e.g., raster-based). For example, the detailed map information 114 may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The detailed map information 114 may be loaded into the memory 108 of the autonomous vehicle 102 at a predetermined time. In one embodiment, the detailed map information 114 may be loaded into the memory 108 of the autonomous vehicle 102 on a daily basis. Alternatively, or in addition, the detailed map information 114 may be loaded into the memory 108 at other predetermined times, such as on a monthly or weekly basis.

As previously discussed, the autonomous driving computer system 144 may include instructions 110 having various algorithms for detecting objects in a driving environment and for cross-validating one or more of the sensors 126 based on the detected objects.

Figure 6:
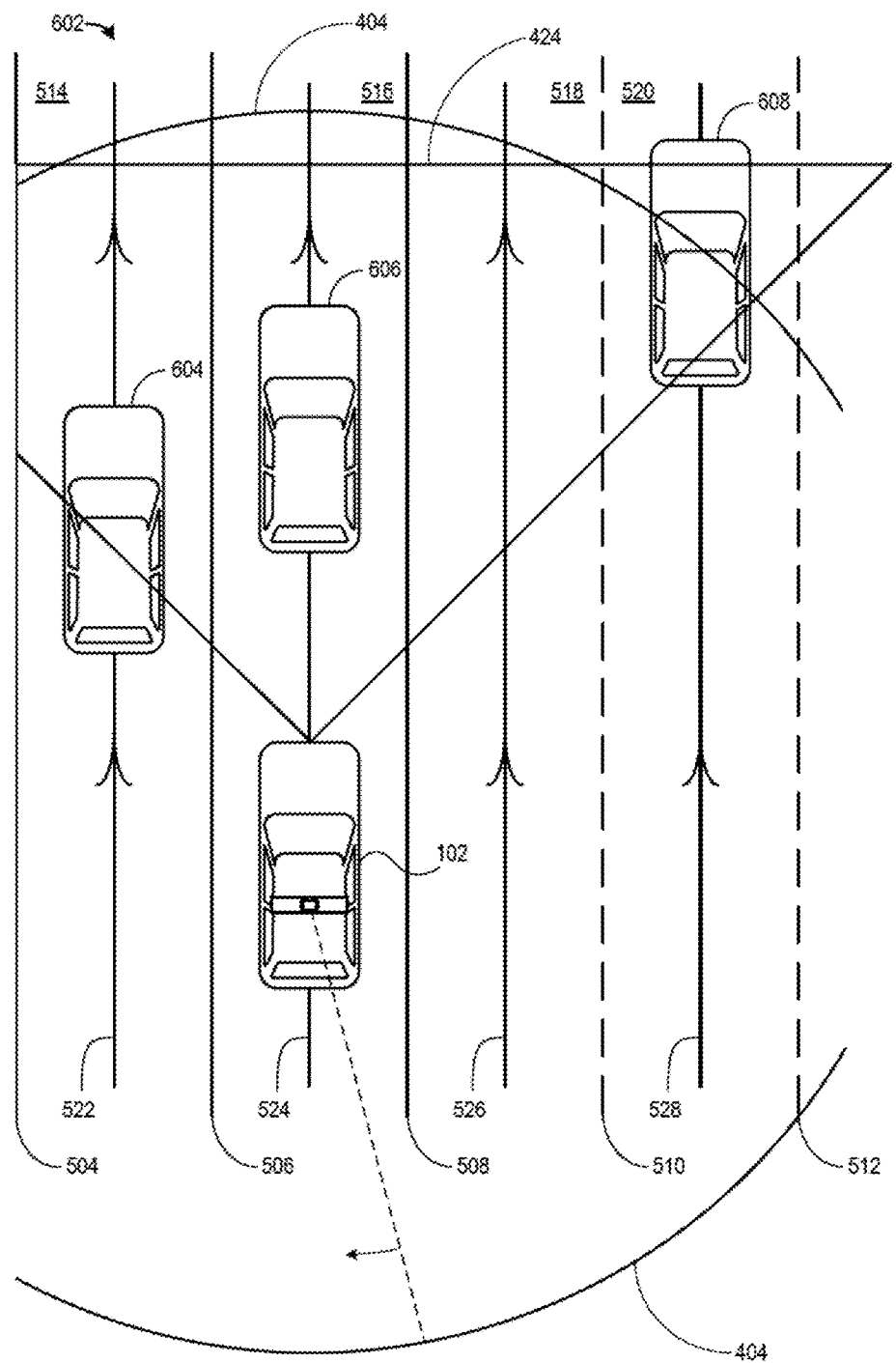
FIG. 6 illustrates an example of the autonomous vehicle detecting one or more vehicles in the driving environment according to aspects of the disclosure.

The vehicle detection algorithm 124 may facilitate the detection of vehicles by the autonomous driving computer system 144. FIG. 6 illustrates an example 602 of the autonomous vehicle 102 in a driving environment. The detailed map 502 may correspond to the driving environment of FIG. 6. In the example 602, the autonomous vehicle 102 may detect one or more vehicles, such as vehicles 604-608, using the vehicle detection algorithm 124. The vehicles 604-608 may be within range of one or more of the sensor fields projected by the autonomous vehicle 102, such as the laser sensor field 404 and the camera sensor field 424. The vehicles 604-608 may be within range of other sensor fields, but these other sensor fields have been omitted for simplicity and clarity.

In the example of FIG. 6, the vehicles 604-608 and the autonomous vehicle 102 may be in various lanes of the driving environment. In particular, the vehicle 604 may be in the lane 514, the vehicle 606 may be in the lane 516, and the vehicle 608 may be in the lane 520. The autonomous vehicle 102 may be in the lane 516.

Figure 7:
FIG. 7 illustrates an example of a raw camera image captured by a camera sensor of the autonomous vehicle according to aspects of the disclosure.
Figure 8:
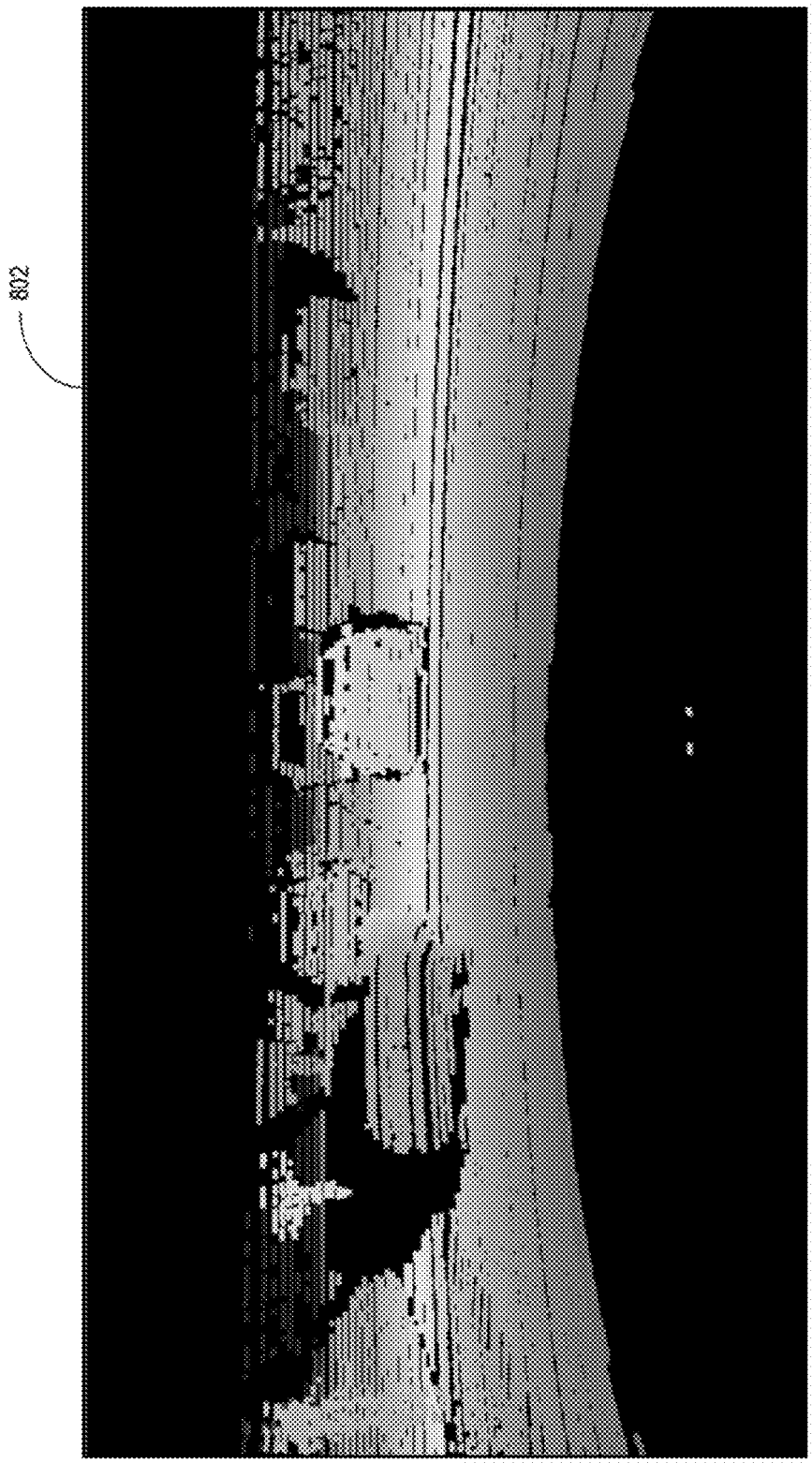
FIG. 8 illustrates an example of a laser point cloud image captured by the laser sensor of the autonomous vehicle according to aspects of the disclosure.

The autonomous driving computer system 144 may receive data from sensors regarding various objects in the autonomous vehicle's surroundings. For example, the autonomous driving computer system 144 may receive data regarding the vehicles 604-608 from the laser 304 (corresponding to the laser sensor field 404) and from the one or more of the cameras 314/316 (corresponding to the camera sensor field 404). FIG. 7 illustrates a camera image 702 captured using one or more of the cameras 314/316. FIG. 8 illustrates an example of a laser point cloud image 802 generated using data from the laser 304. The view shown in the laser point cloud image 802 may approximate the view shown in the camera image 702.

In one embodiment of the cross-validation algorithm 140, the autonomous driving computer system 144 may determine which of the sensors to cross-validate, i.e., which of the sensors to evaluate. In one example, the autonomous driving computer system 144 may determine that the laser 304 is to be cross-validated. As noted above the autonomous driving computer system 144 may determine to cross-validate the laser 304 based on such factors as time (e.g., when the laser 304 was last cross-validated), distance (e.g., how far the autonomous vehicle 104 travelled since last cross-validating the laser 304), manual request (e.g., a passenger requests cross-validation of the laser 304), or any other such factors or combination of factors.

The autonomous driving computer system 144 may then select a first sensor by which to cross-validate the sensor determined for validation above. For example, the autonomous driving computer system 144 may select one or more of the cameras 314/316 to perform the cross-validation of the laser 304. Selection of the cameras 314/316 may be based on one or more selection criterion, such as when the cameras 314/316 were used in a cross-validation or cross-validated themselves, whether the cameras 314/316 are operating within expected parameters, time between cross-validations, and other such criterion.

In cross-validating a sensor, the autonomous driving computer system 144 may be configured to cross-validate the sensor based on one or more parameters. For example, the autonomous vehicle computer system 144 may be configured to cross-validate one or more of the sensors 126 at predetermined time intervals, such as every thirty seconds, every minute, every ten minutes, and so forth. As another example, the autonomous vehicle computer system 144 may be configured to cross-validate one or more of the sensors 126 based on distance travelled by the autonomous vehicle 102, such as every ten meters, every one hundred meters, and so forth. Moreover, different sensors 126 may be cross-validated at different intervals [you have time and distance in the example], e.g., a camera sensor may be cross-validated every ten minutes and a laser sensor may be cross-validated every ten meters.

In cross-validating the sensors of the autonomous vehicle 102, the autonomous driving computer system 144 may use the objects detected in the images produced from the various sensor 14. For example, the autonomous driving computer system 144 may perform vehicle detection on the captured camera image 702 according to the vehicle detection algorithm 124. In this regard, the autonomous driving computer system 144 may refer to one or more of the sensor parameters 148, such as the camera parameters previously discussed, to determine whether there are objects present in the captured camera image 702, and which of the objects are vehicles.

Figure 9:
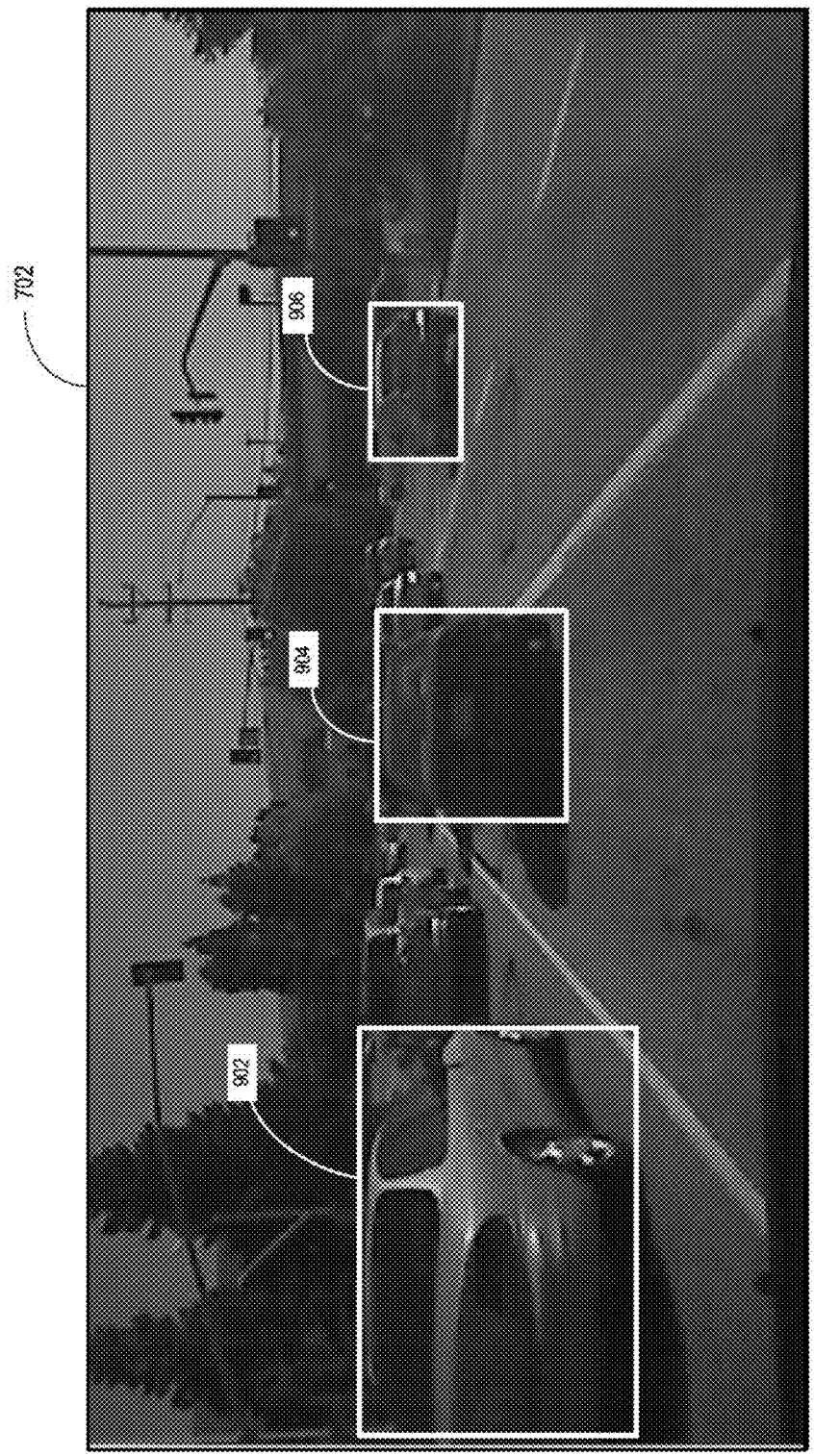
FIG. 9 illustrates examples object labels being applied to detected vehicles shown in the raw camera image of FIG. 7 according to aspects of the disclosure.
Figure 10:
FIG. 10 illustrates object labels being applied to detected vehicles shown in the laser point cloud image of FIG. 8 according to aspects of the disclosure.

When the autonomous driving computer system 144 detects an object, the autonomous driving computer system 144 may apply an object label to the detected object based on one or more of the sensor parameters 148 previously discussed. The object label may be defined by a bounding box encompassing the object. In alternative embodiments, the object label may be defined by a bounding oval or other bounding shape. FIGS. 9-10 illustrate examples of object labels being applied to various objects (i.e., vehicles) detected in the camera image 702 and the laser point cloud image 802.

An object label may have one or more object label parameters that define the shape of the object label. The object label parameters may be defined by one or more of the instructions 110, such as the vehicle detection algorithm 124. Moreover, the object label parameters may vary depending on the sensor type of the sensor that captured the image. For example, where the shape of the object label is a bounding box, and the sensor that captured the image is a one or more of the cameras, the object label parameters may include a height parameter that defines the height of the bounding box (e.g., in pixels), a width parameter that defines the width of the bounding box (e.g., in pixels), a first pixel coordinate that defines the latitudinal placement of the bounding box (e.g., an X-coordinate), and a second pixel coordinate that defines the longitudinal placement of the bounding box (e.g., a Y-coordinate).

Where the sensor that captured the image is one or more of the lasers, the object label parameters may also include a third pixel coordinate that defines the physical height of the object or a particular laser point depicted in the captured image (e.g., a Z-coordinate). This third pixel coordinate should not be confused with the height parameter of the object label, because this third pixel coordinate may indicate the elevation of the detected object or of a given laser point (e.g., 3 meters above sea level, 2 meters above sea level, etc.) This third pixel coordinate may further indicate the height of the detected object or laser point relative to the autonomous vehicle 102.

Where the sensor that provides data about the object is one or more of the radar detection units, the object label parameters may include a height parameter that defines the height of the height of the bounding box (e.g., in pixels), a width parameter that defines the width of the bounding box (e.g., in pixels), a first pixel coordinate that defines the latitudinal placement of the bounding box (e.g., an X-coordinate), and a second pixel coordinate that defines the longitudinal placement of the bounding box (e.g., a Y-coordinate).

FIG. 9 illustrates an example of object labels 902-906 having been applied to vehicles detected in the camera image 702 based on the vehicle detection algorithm 124. As previously discussed, the object labels 902-906 may take the form of a rectangular bounding box that encompasses a detected object. In FIG. 9, the object label 902 may be applied to the vehicle 604, the object label 904 may be applied to the vehicle 606, and the object label 906 may be applied to the vehicle 608.

The autonomous driving computer system 144 may store various parameters about the object labels 902-906. These parameters may include two-dimensional coordinates for each of the vertices of the object labels 902-906, the width of the each of the object labels 902-906, the height of each of the object labels 902-906, and other such parameters.

Having detected the vehicles 604-608, the autonomous driving computer system 144 may also determine state information for each of the vehicles 604-608. State information may include characteristics about the detected vehicles 604-608. Examples of state information include, but are not limited to, the detected vehicle's speed, the path traveled by the vehicle, the driving environment in which the vehicle is traveling, any directional or orientation changes by the vehicle, or other such state information. The state information may also be associated with one or more segments of the detailed map information 114 to further refine the state of the detected vehicle. For example, where the detected vehicle is detected as being on a highway (as defined by the detailed map information 114), the collected state information may identify that the detected vehicle was traveling in a highway, and may further identify the direction of the detected vehicle, various positional information or changes about the detected vehicle (e.g., the original starting lane of the detected vehicle, the ending lane of the detected vehicle), and other such state information.

In determining state information for one or more of the vehicles 604-608, the autonomous driving computer system 144 may determine the state information based on one or more state information parameters. Determining state information for a vehicle may be based on a number of state information parameters associated with the sensor data including predetermined time intervals, distance traveled by the autonomous vehicle 102, number of images produced by the sensor data, clarity and/or accuracy of the images, and other such factors.

For example, with regard to time, the autonomous driving computer system 144 may determine the state information for a vehicle based on one or more camera images, laser point cloud images, radar intensity images, and so forth, produced over a period of two seconds, five seconds, one minute, or other measurement of time.

With regard to distance, the autonomous driving computer system 144 may determine the state information for a vehicle based on one or more images produced over a distance of five meters, ten meters, one kilometer, or other measurement of distance.

Similarly, with regard to the number of images, the autonomous driving computer system 144 may determine the state information for a vehicle based on two images, three images, fifteen images, or any other number of images. Combinations of the state information parameters being used in the determination of the state information for a vehicle are also possible.

State information for one or more of the detected vehicles 604-608 may be used to cross-validate the laser 304. To determine state information for one or more of the vehicles 604-608, the autonomous driving computer system 144 may track and/or monitor the vehicles 604-608 as they travel in the driving environment. In this regard, the state information determined about each of the detected vehicles 604-608 may include the vehicle's position, the vehicle's speed, the vehicle's direction of travel, and other such information. In one embodiment, the autonomous driving computer system 144 may determine this state information from additional camera images (not shown) captured by the one or more cameras 314/316 (e.g., through one or more extrapolation techniques).

The autonomous driving computer system 144 may also determine whether any of the vehicles 604-608 are expected in the field of view of the sensor being cross-validated (i.e., the laser 304). The autonomous driving computer system 144 may perform this determination by determining the position of the vehicles 604-608 relative to the detailed map information 114, and then extrapolating whether the field of view of the laser 304 (i.e., within the sensor field 404) would encompass the vehicles' positions. The vehicles that the autonomous driving computer system 144 determines would be within the field of view of the laser 304 may be used to cross-validate the laser 304.

For example, the autonomous driving computer system 144 may determine that each of the vehicles 604-608 are within the field of view of the laser 304. More generally, the autonomous driving computer system 144 may exclude objects having been detected by the sensor being used in the cross-validation (i.e., the reference sensor), but not within the field of view of the sensor being cross-validated (i.e., the sensor being evaluated). In this regard, the autonomous driving computer system 144 may ensure that only objects appearing in the field of view for both the reference sensor and the sensor being evaluated are used in the cross-validation.

In one embodiment, cross-validation of a sensor may be performed by leveraging the state information determined from the sensor readings of the reference sensor. In general, the autonomous driving computer system 144 may determine vehicle state information based on sensor readings from the reference sensor, and then compare the vehicle state information determined from sensor readings of the reference sensor with vehicle state information determined from the sensor readings of the sensor being evaluated. With reference to the cameras 314/316 (i.e., the reference sensor (s)) and the laser 304 (i.e., the sensor to be evaluated), the autonomous driving computer system 144 may determine vehicle state information based on the sensor readings from one or more of the cameras 314/316, determine vehicle state information based on the sensor readings from the laser 304, and then compare the state information determined from the one or more cameras 314/316 with the state information determined from the laser 304. Based on this comparison, the autonomous driving computer system 144 may determine whether the laser sensor 304 is operating within operational parameters. Similar comparisons may be performed between other sensors used by the computer system 144 to detect and respond to objects external to the autonomous vehicle 102.

In another embodiment, the autonomous driving computer system 144 may apply a first object label to a detected object for a first sensor, apply a second object label to the detected object for a second sensor, and then compare the applied first and second object labels. This may include one or more comparisons of various parameters associated with each object label, such as height and/or width comparisons, positional placement comparisons, vertex coordinate comparisons, object classification comparisons, and other such comparisons. Based on these one or more comparisons, the autonomous driving computer system 144 may determine whether the second sensor detected the object, and whether an accurate object label was applied to the detected object.

FIG. 10 illustrates an example of object labels 1002-1006 having been applied to the vehicles 604-608 detected by the laser 304. The autonomous driving computer system 144 has applied an object label 1002 to the vehicle 604, an object label 1004 to the vehicle 606, and an object label to the vehicle 1006.

The autonomous driving computer system 144 may determine which objects should receive object labels based on the laser sensor parameters previously discussed with reference to FIG. 1. In addition, the autonomous driving computer system 144 may identify disturbances and/or differences in the captured laser point cloud image 802 by comparing the captured laser point cloud image 802 with an expected laser point cloud image based on the detailed map information 114. Areas of the captured laser point cloud image 802 that are different from the expected laser point cloud image based on the detailed map information 114 may indicate an object present in the captured laser point cloud image 802. Those areas may then be analyzed by the autonomous driving computer system 144 to determine whether an object is present in that area. The autonomous driving computer system 144 may then classify the object based on the stored vehicle data 116.

As with determining state information for the vehicles 604-606 based on one or more captured camera images, the autonomous driving computer system may determine state information for the vehicles 604-606 based on one or more laser point cloud images by comparing consecutive captured laser point cloud images. The autonomous driving computer system 144 may then store the state information determined from the laser point cloud images as part of the vehicle data 116.

Determining state information from the sensor data of two different sensors may be based on the same or different state information parameters. For example, the state information parameters used in determining the state information based on the laser point cloud images may be the same, or different from, the state information parameters used in determining state information for the vehicles based on the captured camera images. In this regard, determining state information based on the laser point cloud images may be based on laser point cloud images captured over a distance of two meters, whereas determining state information based on the camera images may be based on camera images captured over a period of two minutes. The values of the state information parameters may also vary (e.g., a time period state information parameter for the camera may be thirty seconds and a time period state information parameter for the laser sensor may be every minute).

The autonomous driving computer system 144 may then compare the state information determined from the determined sensor data with the state information determined from the sensor data from the first sensor selected to cross-validate the determined sensor. Moreover, the cross-validation algorithm 140 may contain instructions such that the autonomous driving computer system 144 compares state information for only objects that appear both in the field of view of the one or more cameras 314/316 and in the field of view of the laser 304.

Comparing state information for one or more vehicles may include comparing any number of vehicle characteristics. For example, comparing state information may include a comparing vehicle's position, a vehicle's speed, a vehicle's heading (i.e., direction of travel), the size of a vehicle, the type of vehicle, or any other combination of characteristics. Furthermore, the autonomous driving computer system 144 may compare the state information relative to the detailed map information 114 (e.g., the detailed map 502) and/or relative to the autonomous vehicle 102. For example, the autonomous driving computer system 144 may compare the position of the vehicle 604 determined from one or more camera images with the position of the vehicle 604 determined from one or more laser point cloud images, relative to the autonomous vehicle 102 or relative to the detailed map 502. Similarly, the autonomous driving computer system 144 may compare the speed of the vehicle 604 determined from one or more camera images with the speed of the vehicle 604 determined from one or more laser point cloud images, relative to the autonomous vehicle 102 or relative to the detailed map 502. Comparing the state information may also be in terms absolute values.

In one embodiment, the results of comparing the state information from the various sensors should indicate that the state information obtained from the sensors is substantially, or nearly, identical. Otherwise, deviations (i.e., differences) in the state information may indicate that a sensor (i.e., the laser 304) is experiencing a problem. To determine whether there are differences, and the extent of those differences, the autonomous driving computer system 144 may employ one or more state information thresholds. For example, there may be a positional threshold (e.g., one meter), a speed threshold (e.g., 0.5 km/hr), a size threshold (e.g., height and/or width), a classification threshold (e.g., one size classification above or below), and other such state information thresholds.

In addition to the state information thresholds, the autonomous driving computer system 144 may establish a multi-level failure threshold based on the compared state information. The multi-level failure threshold may include escalating levels of failure that indicate the extent to which a sensor being cross-validated (i.e., laser 304) is experiencing a problem. For example, the multi-level failure threshold may have a first level of one threshold difference, a second level of two threshold differences, a third level of three threshold differences, and so forth. Thus, where the compared state information indicates that the state information position threshold has been exceeded, the autonomous driving computer system 144 may record that the first level of the multi-level failure threshold was reached. Similarly, where the compared state information indicates that the state information position threshold and the state information speed threshold have been exceeded, the autonomous driving computer system 144 may record that the second level of the multi-level failure threshold was reached.

Based upon the level of failure reached in the multi-level failure threshold, the autonomous driving computer system 144 may take a variety of actions. For example, at the first level of the multi-level failure threshold, the autonomous driving computer system 144 may record in an electronic log that the first level was reached. At the second level of the multi-level failure threshold, the autonomous driving computer system 144 may display an error message. At the third level, the autonomous driving computer system 144 may request that a passenger take control of the autonomous vehicle 102. In this manner, the multi-level failure threshold serves as a safety mechanism to alert a passenger when there is a problem with a sensor being cross-validated.

The autonomous driving computer system 144 may also maintain a total failure count threshold. The total failure count threshold may be in addition to the multi-level failure threshold. The total failure count threshold may be a threshold based on the number of times a state information threshold has been exceeded, either during the cross-validation of a sensor, the lifetime of a sensor, or at any other time. There may be a global total failure count threshold (i.e., a failure count threshold for all the sensors 146 of the autonomous vehicle 102), total failure count thresholds for each sensor of the autonomous vehicle 102, or combinations thereof. Furthermore, each of the state information characteristics (e.g., position, speed, heading, etc.) may each have their own failure count threshold. The failure count threshold may be as low as five (or lower) or as high as ten (or higher).

Similar to the multi-level failure threshold, the autonomous driving computer system 144 may take a variety of actions based on the value of the total failure count threshold (global or individual sensor), based on the values of the individual failure count thresholds for the state information, or a combination thereof. For example, each time the individual sensor total failure count is increased, the autonomous driving computer system 144 may record this fact in an electronic log. However, when the individual sensor total failure count is equal to or greater than a first predetermined value (e.g., fifty), the autonomous driving computer system 144 may display an error message regarding the failure (e.g., the fact that a sensor failed to cross-validate, that a specific state information characteristic was different, etc.). Moreover, when the individual sensor total failure count is equal to or greater than a second predetermined value (e.g., two hundred), the autonomous driving computer system 144 may request that a passenger take control of the autonomous vehicle 102.

Each of the failure thresholds (e.g., the multi-level failure threshold and/or the failure count threshold(s)), may be used to quickly identify different problems in the sensors of the autonomous vehicle 102. For example, the multi-level failure threshold may be used to identify a single, catastrophic failure in a sensor (e.g., the failure count may be low, but all of the state information thresholds may have been exceeded). As another example, a failure count threshold may be used to identify an intermittent problem, such as where a failure count threshold is increased at time $t_0$, not increased at time $t_1$ (e.g., one minute from time $t_0$), but then increased again at time $t_2$ (e.g., two minutes from time $t_2$). In this regard, the various failure thresholds for the compared state information serve as safety mechanisms to readily identify potential failures or problems in sensors being cross-validated.

As mentioned above, comparing determined state information may encompass one embodiment of the cross-validation algorithm 140. In another embodiment of the cross-validation algorithm 140, the autonomous driving computer system 144 may be configured to compare the object labels applied to the objects detected in the captured images (e.g., the camera image 702 and the laser point cloud image 802).

Figure 11:
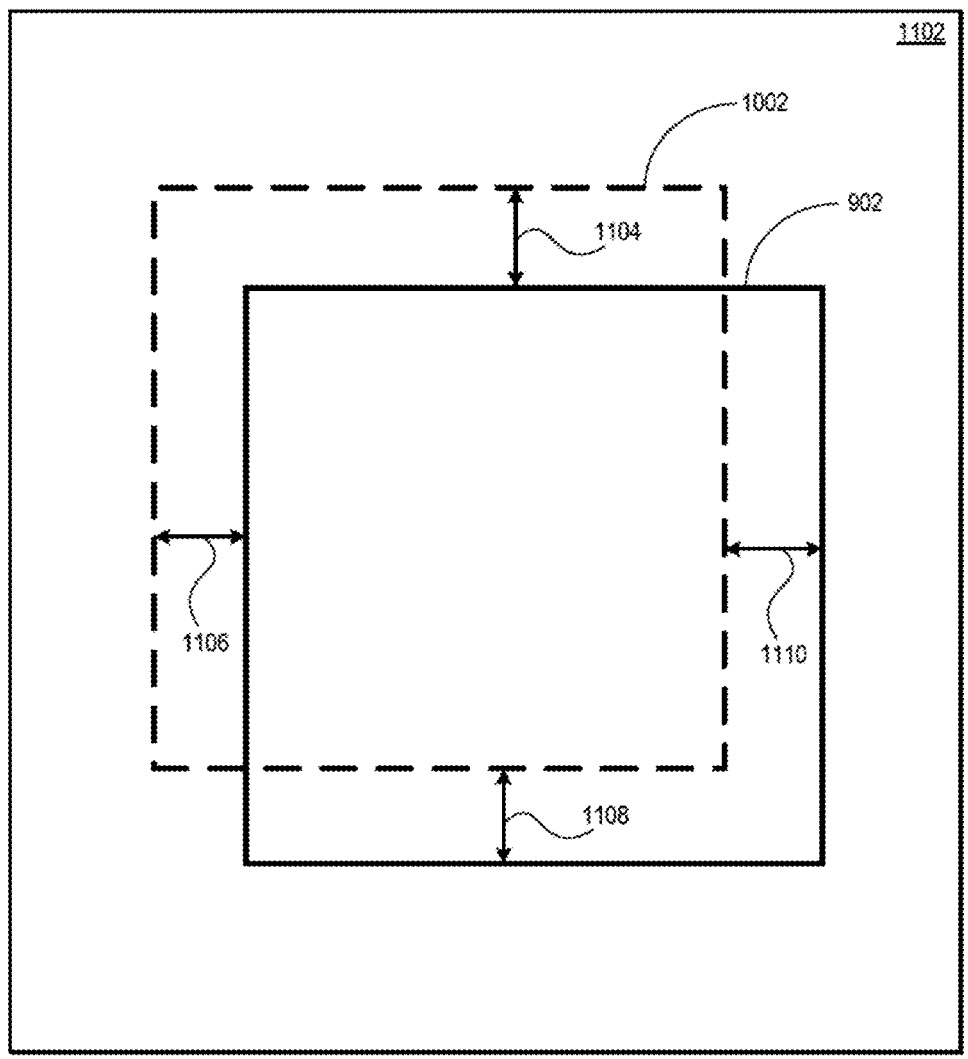
FIG. 11 illustrates an example of comparing object labels applied to objects detected by different types of sensors according to aspects of the disclosure.

FIG. 11 illustrates an example 1102 of comparing a first object label (e.g., object label 902) and a second object label (e.g., object label 1002). The autonomous driving computer system 144 may compare various characteristics of the object labels 902,1002. For example, the autonomous driving computer system 144 may compare the height and/or width of the object labels 902,1002, the placement of the object labels 902,1002 in the camera image 702 and the laser point cloud image 802, the individual locations of the vertices of the object labels 902,1002 relative to their respective images 702,802, and other such characteristics.

FIG. 11 illustrates comparing the height and width of the object labels 902,1002. When corrected for perspective (e.g., the laser point cloud image 802 may be slightly skewed compared to the camera image 702), a comparison of the height and width of the object labels 902,1002 may serve as a proxy for determining whether the laser 304 is operating within expected parameters.

In comparing the object labels 902,1002, the autonomous driving computer system 144 may determine a number of object label deviations. The number of object label deviations may be dependent on the number of sides of the object label. For example, where the object label is a polygon, such as a rectangular bounding box, the object label deviations may include four deviations: a first height deviation 1104, a second height deviation 1108, a first width deviation 1106, and a second width deviation 1110. The number of deviations may be more where there are more sides to the object labels, such as in the case of pentagons, hexagons, or other multi-sided polygons, or the number of deviations may be less, such as in the case of triangles, circles, ovals, or other similar shapes.

The object label deviations may be measured in physical units (e.g., centimeters, meters, etc.) or in electronic units (e.g., pixels). In this regard, the deviations may be assigned values based on the physical characteristics of the object encompassed by the object label (e.g., vehicle 604) or the deviations may be assigned values based on the characteristics of the captured image in which the object appears.

In addition to determining object label deviations based on individual comparisons (e.g., the comparison of object label 902 with the object label 1002), the autonomous driving computer system 144 may also determine deviations based on an aggregation of comparisons, such as ten, twenty, or more comparisons. In this regard, the comparisons may include a first comparison of a first object label applied to the vehicle 604 in a first image captured by the one or more cameras 314/316 with a first object label applied to the vehicle 604 in a first image captured by the laser 304, a second comparison of a second object label applied to the vehicle 604 in a second image captured by the one or more cameras 314/316 with a second object label applied to the vehicle 604 in a second image captured by the laser 304, and so forth.

The object label deviations determined from the aggregation of comparisons may include one or more maximum deviations, one or more average deviations, and one or more average signed deviations. For example, there may be four maximum deviations, four average deviations, and four average signed deviations (i.e., a total of twelve deviations), where each deviation corresponds to a side of a rectangular bounding box, such as the object labels 902, 1002. There may be more or less maximum, average, and signed average deviations depending on the number of sides of the object labels being compared.

The values of the maximum deviation(s), average deviation(s), and/or average signed deviation(s) may vary. In particular, the value of the maximum deviation may equal the value of the maximum difference for a compared set of deviations (e.g., thirty pixels, twenty pixels, fifty meters, etc.). The value of the average deviation may equal the average value of the differences for a compared set of deviations (e.g., two pixels, one meter, etc.). The value of the average signed deviation may equal the average value of the differences for a compared set of deviations and may also indicate whether a side of a object label is shifted to the left/down (where the average signed deviation is negative) or shifted to the right/up (where the average signed deviation is positive). Examples of values for the average signed deviation may include −10 pixels, +10 pixels, −2 meters, +2 meters, and other such values. The maximum, average, and average signed deviations may be based on all sides being compared, for a single side being compared, or combinations thereof.

In one embodiment, the autonomous driving computer system 144 may establish one or more deviation thresholds by which to compare the aforementioned deviations, including the object label deviations 1104-1110. In this regard, the autonomous driving computer system 144 may establish one or more deviation thresholds for a singular object label (e.g., a first height object label deviation threshold) and/or one or more deviation thresholds for the determined maximum deviation, the determined average deviation, and the determined average signed deviation.

Comparisons of the deviations with their corresponding deviation thresholds may indicate whether the sensor being cross-validated is experiencing a problem and the extent of that problem. For example, a comparison of the maximum deviation with the maximum deviation threshold may indicate the magnitude of the problem being experienced by the sensor. Similarly, a comparison of the average signed deviation with the average signed deviation threshold may, not only indicate the magnitude of the problem being experienced by the sensor, but also the extent to which the sensor may be improperly calibrated (e.g., are the sensor readings too far to the left, too far to the right, too high up, too far down, etc.).

The values of the one or more deviation thresholds may be different, or the same as, each other. For example, a first width deviation threshold may have the same value as a second width deviation threshold. However, the values may also be different. Similarly, a first height deviation threshold may have the same or different value as a second height deviation threshold.

Combinations of the foregoing embodiments are also possible. For example, in comparing state information determined from the one or more cameras 314/316 with the state information determined from the laser 304, the autonomous driving computer system 144 may establish a maximum deviation and maximum deviation threshold, an average deviation and an average deviation threshold, and an average signed deviation and an average signed deviation threshold. Similarly, in comparing object labels (e.g., object labels 902,1002), the autonomous driving computer system 144 may establish a multi-level failure threshold for monitoring when one or more of the height and/or width deviation thresholds have been exceeded, and the autonomous driving computer system 144 may establish a failure count threshold for monitoring the number of times one or more of the deviation thresholds for the object labels 902,1002 have been exceeded.

Figure 12:
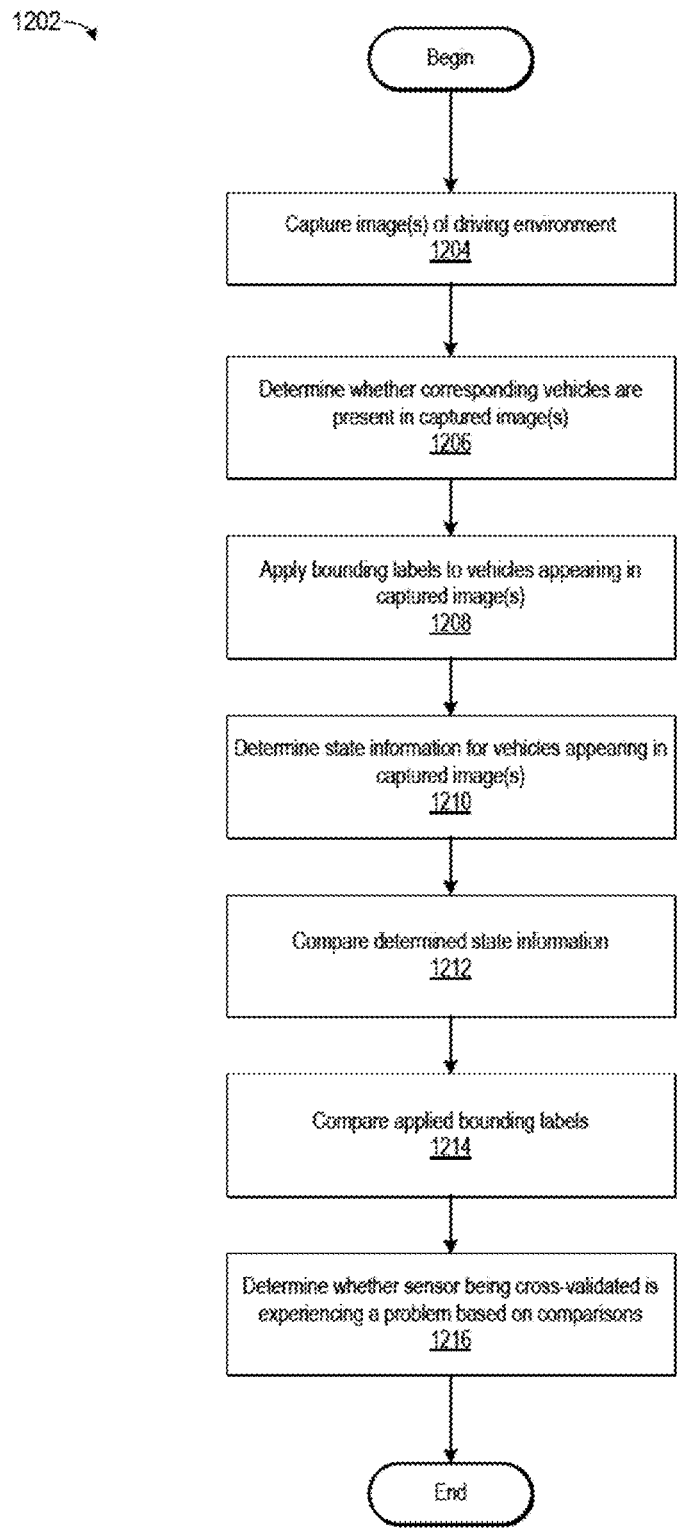
FIG. 12 illustrates an example of logic flow for cross-validating sensors of the autonomous vehicle according to aspects of the disclosure.

FIG. 12 illustrates an example of logic flow 1202 for cross-validating a sensor of the autonomous vehicle 102. Initially, one or more sensors 146 of the autonomous vehicle may capture one or more images of the driving environment (Block 1204). As discussed with reference to FIG. 7 and FIG. 8, these images may include camera images and/or laser point cloud images.

The autonomous driving computer system 144 may then select which sensor to use a reference sensor (e.g., one or more of the cameras 314/316) and which sensor to cross-validate (e.g., the laser 304). The autonomous driving computer system 144 may then determine whether, and which, objects appearing in one or more images captured by the reference sensor are in one or more images captured by the sensor to be cross-validated (Block 1206). The autonomous driving computer system 144 may then apply object labels to the objects appearing in both sets of images (Block 1208). Alternatively, the object labels may be applied to objects in the first and second set of images, and then the autonomous driving computer system 144 may determine which objects the first and second set of images have in common.

The autonomous driving computer system 144 may then determine state information from the one or more common objects appearing in the one or more images captured by the reference sensor and determine state information for the same objects appearing in the one or more images captured by the sensor being cross-validated (Block 1210). As previously discussed, the state information may include position (relative to the autonomous vehicle 102 and/or driving environment), changes in position, speed (also relative to the autonomous vehicle 102 and/or driving environment), changes in speed, heading, and other such state information.

The autonomous driving computer system 144 may then compare the state information for the common objects to determine one or more deviation values (Block 1212). As previously discussed, the deviation values may include deviation values specific to individual state characteristics (e.g., a positional deviation value, a speed deviation value, etc.) but may also include deviation values determined in the aggregate (e.g., a maximum deviation value, an average deviation value, and an average signed deviation value).

Alternatively, or in addition, the autonomous driving computer system 144 may compare the object labels applied to the common objects (Block 1214). Comparing the object labels may include comparing the object labels from images captured at approximately the same time and/or comparing the object labels from one or more images captured during a predetermined time interval. As with the comparison of the state information, the autonomous driving computer system 144 may determine various deviation values based on the comparison of the object labels.

The autonomous driving computer system 144 may then determine whether the sensor being cross-validated is having a problem (Block 1216). As discussed previously, the autonomous driving computer system 144 may perform this determination by comparing one or more of the determined deviation values with one or more deviation thresholds. The autonomous driving computer system 144 may also establish one or more failure thresholds (e.g., the multi-level failure threshold, the failure count threshold, etc.) that may be exceeded when one or more of the deviation values exceed their corresponding deviation thresholds. The autonomous driving computer system 144 may be configured to perform a variety of actions (e.g., record in an electronic log, display a warning message, request a passenger to take control of the autonomous vehicle, etc.) based on whether one or more of the failure thresholds are exceeded.

In this manner, the autonomous driving computer system 144 determines whether a sensor is experiencing a problem based on sensor readings obtained from another sensor (i.e., the reference sensor). The sensors may even be different types of sensors. Moreover, the autonomous driving computer system 144 may be configured to determine whether the sensor being cross-validated has experienced a catastrophic failure (e.g., the sensor readings from the sensor being cross-validated are substantially different than the sensor readings from the reference sensor) or is experiencing an intermittent problem. As the cross-validation methods and system disclosed herein may be used to determine when a sensor is experiencing a problem, the safety and confidence of the autonomous vehicle in navigating a driving environment is enhanced.

Although aspects of this disclosure have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of this disclosure as defined by the appended claims. Furthermore, while certain operations and functions are shown in a specific order, they may be performed in a different order unless it is expressly stated otherwise.

The invention claimed is:

1. A system for validating the accuracy of a sensor, the system comprising:
one or more computing devices having one or more processors configured to:
receive first sensor information from a first sensor configured to detect objects in a vehicle's environment;
receive second sensor information from a second sensor configured to detect objects in a vehicle's environment;
identify a first object and a first characteristic value of the first object using the first sensor information;
identify the first object and a second characteristic value of the first object using the second sensor information, wherein the first characteristic and the second characteristic are of a same type;
determine a deviation value based on the first characteristic value with the second characteristic value; and
use the deviation value to determine whether the first sensor is accurately detecting the object by comparing the deviation value to a deviation threshold value identifying an acceptable amount of difference between the first and second characteristic values; and
when the comparison indicates that the deviation value does not meet the deviation threshold value, determine that the first sensor has had an operational failure.

2. The system of claim 1, further comprising the first sensor and the second sensor.

3. The system of claim 2, wherein the first sensor includes a laser and the second sensor includes a camera.

4. The system of claim 1, wherein the first and second characteristic values each defines a dimension of the object.

5. The system of claim 1, wherein the first and second characteristic values each defines a position of the object.

6. The system of claim 1, wherein the first and second characteristic values each define a heading of the object.

7. The system of claim 1, further comprising the vehicle.

8. The system of claim 1, wherein the one or more processors are further configured to:
memory storing a failure count value for each of the first and second sensors; and
wherein the one or more processors are further configured to change the failure count value for the first sensor based upon the determination that the first sensor has had an operational failure.

9. The system of claim 8, wherein the vehicle includes an autonomous driving mode and a manual driving mode, and the one or more processors are further configured to use the failure count value to determine whether to switch from the autonomous driving mode to a manual driving mode.

10. The system of claim 1, wherein the one or more processors are further configured to select the deviation threshold value from a plurality of deviation threshold values based on the type of the first and second characteristic values.

11. The system of claim 1, wherein the first and second characteristic values are numerical values.

12. A method for validating the accuracy of a sensor, the method comprising:
receiving, by one or more processors, first sensor information from a first sensor configured to detect objects in a vehicle's environment;
receiving, by the one or more processors, second sensor information from a second sensor configured to detect objects in a vehicle's environment;

identifying, by the one or more processors, a first object and first characteristic value of the first object using the first sensor information;

identifying, by the one or more processors, the first object and second characteristic value of the first object using the second sensor information, wherein the first characteristic and the second characteristic are of a same type;

determining, by the one or more processors, a deviation value based on the first characteristic value with the second characteristic value; and using, by the one or more processors, the deviation value to determine whether the first sensor is accurately detecting the object by comparing the deviation value to a deviation threshold value identifying an acceptable amount of difference between the first and second characteristic values; and when the comparison indicates that the deviation value does not meet the deviation threshold value, determining that the first sensor has had an operational failure.

13. The method of claim 12, further comprising changing a stored failure count value for the first sensor based upon the determination that the first sensor has had an operational failure.

14. The method of claim 13, wherein the vehicle includes an autonomous driving mode and a manual driving mode, and the method further comprises, using the failure count value to determine whether to switch from the autonomous driving mode to a manual driving mode.

15. The method of claim 12, further comprising selecting the deviation threshold value from a plurality of deviation threshold values based on the type of the first and second characteristic values.

16. The system of method 12, wherein the first sensor includes a laser and the second sensor includes a camera.

17. A non-transitory computer readable medium on which instructions are stored, the instructions, when executed by one or more processors, cause the one or more processors to perform a method for validating the accuracy of a sensor, the method comprising:

receiving first sensor information from a first sensor configured to detect objects in a vehicle's environment;

receiving second sensor information from a second sensor configured to detect objects in a vehicle's environment;

identifying a first object and first characteristic value of the first object using the first sensor information;

identifying the first object and second characteristic value of the first object using the second sensor information, wherein the first characteristic and the second characteristic are of a same type;

determining a deviation value based on the first characteristic value with the second characteristic value;

selecting a deviation threshold value from a plurality of deviation threshold values based on the type of the first and second characteristic values;

using the deviation value to determine whether the first sensor is accurately detecting the object by comparing the deviation value to a deviation threshold value identifying an acceptable amount of difference between the first and second characteristic values; and when the comparison indicates that the deviation value does not meet the deviation threshold value, determine that the first sensor has had an operational failure.

18. The medium of claim 17, wherein the method further comprises changing a stored failure count value for the first sensor based upon the determination that the first sensor has had an operational failure.

19. The medium of claim 18, wherein the vehicle includes an autonomous driving mode and a manual driving mode, and the method further comprises, using the failure count value to determine whether to switch from the autonomous driving mode to a manual driving mode.

20. The medium of claim 17, wherein the first sensor includes a laser and the second sensor includes a camera.

* * * * *